(12) United States Patent
Tranquill et al.

(10) Patent No.: US 11,924,375 B2
(45) Date of Patent: Mar. 5, 2024

(54) AUTOMATED RESPONSE ENGINE AND FLOW CONFIGURED TO EXCHANGE RESPONSIVE COMMUNICATION DATA VIA AN OMNICHANNEL ELECTRONIC COMMUNICATION CHANNEL INDEPENDENT OF DATA SOURCE

(71) Applicant: Khoros, LLC, Austin, TX (US)

(72) Inventors: Christopher Tranquill, Sherwood, OR (US); Justin August Fellers, Austin, TX (US); Ryan Studer, Lees Summit, MO (US)

(73) Assignee: Khoros, LLC, Austin, TX (US)

( * ) Notice: Subject to any disclaimer, the term of this patent is extended or adjusted under 35 U.S.C. 154(b) by 217 days.

(21) Appl. No.: 17/511,763

(22) Filed: Oct. 27, 2021

(65) Prior Publication Data
US 2023/0130308 A1 Apr. 27, 2023

(51) Int. Cl.
*H04M 3/493* (2006.01)
*G10L 15/02* (2006.01)
(Continued)

(52) U.S. Cl.
CPC ........... *H04M 3/4936* (2013.01); *G10L 15/02* (2013.01); *G10L 15/1815* (2013.01); *G10L 15/22* (2013.01); *H04M 3/5315* (2013.01)

(58) Field of Classification Search
CPC ............. H04M 3/4936; H04M 3/5315; H04M 3/42382; H04M 3/5141; H04M 3/5166;
(Continued)

(56) References Cited

U.S. PATENT DOCUMENTS 6,041,311 A  3/2000  Chislenko et al.
6,146,026 A  11/2000  Ushiku
(Continued)

FOREIGN PATENT DOCUMENTS

CN  102054033 A  5/2011
CN  103177095 B  12/2015
(Continued)

OTHER PUBLICATIONS

"Craigslist Online Community." Craigslist.org. Jul. 6, 2010.
(Continued)

*Primary Examiner* — Akelaw Teshale
(74) *Attorney, Agent, or Firm* — KOKKA & BACKUS, PC

(57) ABSTRACT

Various embodiments relate generally to data science and data analysis, computer software and systems, and control systems to provide a platform to implement automated responses to data representing electronic messages, among other things, and, more specifically, to a computing and data platform that implements logic to facilitate implementation of an automated predictive response computing system independent of electronic communication channel or payload of an electronic message payload, the automated predictive response computing system being configured to implement, for example, an automated voice-text response engine configured to build and adaptively implement conversational data flows based on, for example, classification of an electronic message and a predictive response. In some examples, a method may include detecting an electronic message includes inbound voice data, analyzing inbound voice data, invoking an automated response application, and selecting a response, among other things.

20 Claims, 13 Drawing Sheets

(51) Int. Cl.
*G10L 15/18* (2013.01)
*G10L 15/22* (2006.01)
*H04M 3/53* (2006.01)

(58) Field of Classification Search
CPC ..... G10L 15/02; G10L 15/1815; G10L 15/22; H04L 51/02
See application file for complete search history.

(56) References Cited

U.S. PATENT DOCUMENTS

| | | |
|---|---|---|
| 6,385,611 B1 | 5/2002 | Cardona |
| 6,684,239 B1 | 1/2004 | Flepp et al. |
| 6,742,032 B1 | 5/2004 | Castellani et al. |
| 6,871,232 B2 | 3/2005 | Curie et al. |
| 7,031,952 B1 | 4/2006 | Heumann et al. |
| 7,032,030 B1 | 4/2006 | Codignotto |
| 7,222,156 B2 | 5/2007 | Gupta et al. |
| 7,409,710 B1 | 8/2008 | Uchil et al. |
| 7,590,636 B1 | 9/2009 | Heumann et al. |
| 7,606,865 B2 | 10/2009 | Kumar et al. |
| 7,644,057 B2 | 1/2010 | Nelken et al. |
| 7,702,541 B2 | 4/2010 | Black et al. |
| 7,725,492 B2 | 5/2010 | Sittig et al. |
| 7,751,620 B1 | 7/2010 | Cosoi |
| 7,756,926 B2 | 7/2010 | Tseng et al. |
| 7,792,948 B2 | 9/2010 | Zhao et al. |
| 7,818,758 B2 | 10/2010 | Bonet et al. |
| 7,831,912 B2 | 11/2010 | King et al. |
| 7,853,565 B1 | 12/2010 | Liskov |
| 7,979,369 B2 | 7/2011 | Grenier et al. |
| 8,006,187 B1 | 8/2011 | Bailey et al. |
| 8,027,931 B2 | 9/2011 | Kalaboukis |
| 8,082,308 B1 | 12/2011 | Filev |
| 8,131,745 B1 | 3/2012 | Hoffman et al. |
| 8,171,128 B2 | 5/2012 | Zuckerberg et al. |
| 8,200,527 B1 | 6/2012 | Thompson et al. |
| 8,225,376 B2 | 7/2012 | Zuckerberg et al. |
| 8,286,154 B2 | 10/2012 | Kaakani et al. |
| 8,321,300 B1 | 11/2012 | Bockius et al. |
| 8,412,657 B2 | 4/2013 | Grenier et al. |
| 8,437,369 B2 | 5/2013 | Shaikli |
| 8,505,069 B1 | 8/2013 | Solodovnikov et al. |
| 8,606,792 B1 | 12/2013 | Jackson et al. |
| 8,615,442 B1 | 12/2013 | Kapur et al. |
| 8,744,937 B2 | 6/2014 | Seubert et al. |
| 8,752,041 B2 | 6/2014 | Akiyoshi et al. |
| 8,769,417 B1 | 7/2014 | Robinson et al. |
| 8,813,125 B2 | 8/2014 | Reisman |
| 8,825,515 B1 | 9/2014 | Hanson |
| 8,886,580 B2 | 11/2014 | Grenier et al. |
| 8,892,524 B1 | 11/2014 | Lee et al. |
| 8,943,069 B2 | 1/2015 | Heumann et al. |
| 8,972,428 B2 | 3/2015 | Dicker et al. |
| 8,996,639 B1* | 3/2015 | Faaborg ............... H04L 51/02 455/412.2 |
| 9,021,361 B1 | 4/2015 | Pettinati et al. |
| 9,105,044 B2 | 8/2015 | Wu |
| 9,131,382 B1 | 9/2015 | Johns |
| 9,141,997 B2 | 9/2015 | Gaedcke et al. |
| 9,143,478 B2 | 9/2015 | Ramaswamy |
| 9,229,702 B1 | 1/2016 | Kapulkin et al. |
| 9,251,360 B2 | 2/2016 | Meyer et al. |
| 9,282,098 B1 | 3/2016 | Hitchcock et al. |
| 9,286,102 B1 | 3/2016 | Harel et al. |
| 9,311,683 B1 | 4/2016 | Saylor et al. |
| 9,325,696 B1 | 4/2016 | Balfanz et al. |
| 9,338,186 B2 | 5/2016 | Wollenstein et al. |
| 9,369,454 B2 | 6/2016 | Porzio et al. |
| 9,378,295 B1 | 6/2016 | Marra et al. |
| 9,483,802 B2 | 11/2016 | Gaedcke et al. |
| 9,501,746 B2 | 11/2016 | Prakash |
| 9,509,742 B2 | 11/2016 | Gordon |
| 9,514,459 B1 | 12/2016 | Doshi et al. |
| 9,519,723 B2 | 12/2016 | Lorenz et al. |
| 9,596,206 B2 | 3/2017 | Bueno et al. |
| 9,619,531 B2 | 4/2017 | Wu |
| 9,654,450 B2 | 5/2017 | Ford et al. |
| 9,756,098 B2 | 9/2017 | Kazerani et al. |
| 9,787,664 B1 | 10/2017 | Subbiah et al. |
| 9,800,639 B2 | 10/2017 | Gordon |
| 9,953,063 B2 | 4/2018 | Spasojevic et al. |
| 10,084,838 B2 | 9/2018 | Gordon et al. |
| 10,142,386 B2 | 11/2018 | Gordon |
| 10,178,173 B2 | 1/2019 | Kadowaki et al. |
| 10,180,971 B2 | 1/2019 | Bhave et al. |
| 10,188,905 B2 | 1/2019 | Dohlen |
| 10,204,344 B2 | 2/2019 | Gaedcke et al. |
| 10,204,383 B2 | 2/2019 | Gaedcke et al. |
| 10,264,042 B2 | 4/2019 | Gordon |
| 10,264,073 B2 | 4/2019 | Kadowaki et al. |
| 10,284,723 B1 | 5/2019 | Neuer, III et al. |
| 10,346,449 B2 | 7/2019 | Senftleber et al. |
| 10,417,180 B1 | 9/2019 | Patwardhan |
| 10,430,894 B2 | 10/2019 | Wu |
| 10,489,866 B2 | 11/2019 | Gaedcke et al. |
| 10,491,490 B2 | 11/2019 | Sridhar et al. |
| 10,497,069 B2 | 12/2019 | Gaedcke et al. |
| 10,594,773 B2 | 3/2020 | Falcao et al. |
| 10,601,937 B2 | 3/2020 | Holzband et al. |
| 10,785,222 B2 | 9/2020 | Senftleber et al. |
| 10,855,657 B2 | 12/2020 | Senftleber et al. |
| 10,867,131 B2 | 12/2020 | Scott et al. |
| 10,902,462 B2 | 1/2021 | Savage et al. |
| 10,931,540 B2 | 2/2021 | Davis et al. |
| 10,956,459 B2 | 3/2021 | Senftleber et al. |
| 10,999,278 B2 | 5/2021 | Senftleber et al. |
| 11,050,704 B2 | 6/2021 | Senftleber et al. |
| 11,061,900 B2 | 7/2021 | Falcao et al. |
| 11,087,261 B1 | 8/2021 | Basu et al. |
| 11,388,132 B1* | 7/2022 | Paul ..................... G06F 3/0482 |
| 11,488,077 B1* | 11/2022 | Lyman ................ H04L 12/2825 |
| 2001/0025253 A1 | 9/2001 | Heintz et al. |
| 2001/0037469 A1 | 11/2001 | Gupta et al. |
| 2001/0042087 A1 | 11/2001 | Kephart et al. |
| 2001/0047290 A1 | 11/2001 | Petras et al. |
| 2002/0010746 A1 | 1/2002 | Jilk et al. |
| 2002/0049793 A1 | 4/2002 | Okumura et al. |
| 2002/0070953 A1 | 6/2002 | Barg et al. |
| 2002/0105545 A1 | 8/2002 | Carter et al. |
| 2002/0144156 A1 | 10/2002 | Copeland |
| 2003/0005103 A1 | 1/2003 | Narad et al. |
| 2003/0028525 A1 | 2/2003 | Santos et al. |
| 2003/0078959 A1 | 4/2003 | Yeung et al. |
| 2003/0128203 A1 | 7/2003 | Marshall et al. |
| 2003/0135565 A1 | 7/2003 | Estrada |
| 2003/0187871 A1 | 10/2003 | Amano et al. |
| 2003/0225850 A1 | 12/2003 | Teague |
| 2004/0049673 A1 | 3/2004 | Song et al. |
| 2004/0073666 A1 | 4/2004 | Foster et al. |
| 2004/0133697 A1 | 7/2004 | Mamaghani et al. |
| 2004/0174397 A1 | 9/2004 | Cereghini et al. |
| 2005/0060643 A1 | 3/2005 | Glass et al. |
| 2005/0074126 A1 | 4/2005 | Stanko |
| 2005/0132348 A1 | 6/2005 | Meulemans et al. |
| 2005/0206644 A1 | 9/2005 | Kincaid |
| 2005/0283614 A1 | 12/2005 | Hardt |
| 2006/0010215 A1 | 1/2006 | Clegg et al. |
| 2006/0036685 A1 | 2/2006 | Canning et al. |
| 2006/0129602 A1 | 6/2006 | Witriol et al. |
| 2006/0143307 A1 | 6/2006 | Codignotto |
| 2006/0155581 A1 | 7/2006 | Eisenberger et al. |
| 2006/0185021 A1 | 8/2006 | Dujari et al. |
| 2006/0206578 A1 | 9/2006 | Heidloff et al. |
| 2006/0285657 A1* | 12/2006 | Lippke ................. H04M 3/493 379/67.1 |
| 2006/0294196 A1 | 12/2006 | Feirouz et al. |
| 2007/0083536 A1 | 4/2007 | Darnell et al. |
| 2007/0118889 A1 | 5/2007 | Fredell |
| 2007/0136354 A1 | 6/2007 | Chen |
| 2007/0171716 A1 | 7/2007 | Wright et al. |
| 2007/0220029 A1 | 9/2007 | Jones et al. |
| 2007/0226177 A1 | 9/2007 | Barsness et al. |
| 2007/0240119 A1 | 10/2007 | Ducheneaut et al. |

(56) References Cited

U.S. PATENT DOCUMENTS

| | | |
|---|---|---|
| 2007/0282800 A1 | 12/2007 | England et al. |
| 2007/0286528 A1 | 12/2007 | Podilchuk |
| 2007/0289006 A1 | 12/2007 | Ramachandran et al. |
| 2008/0005284 A1 | 1/2008 | Ungar et al. |
| 2008/0033776 A1 | 2/2008 | Marchese |
| 2008/0034058 A1 | 2/2008 | Korman et al. |
| 2008/0040673 A1 | 2/2008 | Zuckerberg et al. |
| 2008/0103906 A1 | 5/2008 | Singh |
| 2008/0109245 A1 | 5/2008 | Gupta |
| 2008/0109491 A1 | 5/2008 | Gupta |
| 2008/0120379 A1 | 5/2008 | Malik |
| 2008/0126476 A1 | 5/2008 | Nicholas et al. |
| 2008/0133488 A1 | 6/2008 | Bandaru et al. |
| 2008/0178125 A1 | 7/2008 | Elsbree et al. |
| 2008/0189406 A1 | 8/2008 | Shen |
| 2008/0201344 A1 | 8/2008 | Levergood et al. |
| 2008/0215591 A1 | 9/2008 | Howard et al. |
| 2008/0221870 A1 | 9/2008 | Attardi et al. |
| 2008/0225848 A1 | 9/2008 | Pilon et al. |
| 2008/0263603 A1 | 10/2008 | Murray et al. |
| 2008/0294680 A1 | 11/2008 | Powell et al. |
| 2008/0306830 A1 | 12/2008 | Lasa et al. |
| 2009/0013043 A1 | 1/2009 | Tan |
| 2009/0043852 A1 | 2/2009 | Weir et al. |
| 2009/0089657 A1 | 4/2009 | Davis |
| 2009/0106080 A1 | 4/2009 | Carrier et al. |
| 2009/0132311 A1 | 5/2009 | Klinger et al. |
| 2009/0138472 A1 | 5/2009 | MacLean |
| 2009/0144723 A1 | 6/2009 | Hartin et al. |
| 2009/0157667 A1 | 6/2009 | Brougher et al. |
| 2009/0157708 A1 | 6/2009 | Bandini et al. |
| 2009/0157899 A1 | 6/2009 | Gagliardi et al. |
| 2009/0158265 A1 | 6/2009 | Davis et al. |
| 2009/0177670 A1 | 7/2009 | Grenier et al. |
| 2009/0181649 A1 | 7/2009 | Bull et al. |
| 2009/0210282 A1 | 8/2009 | Elenbaas et al. |
| 2009/0249451 A1 | 10/2009 | Su et al. |
| 2009/0292608 A1 | 11/2009 | Polachek |
| 2009/0292722 A1 | 11/2009 | Ayloo |
| 2009/0300036 A1 | 12/2009 | Nagasaki |
| 2010/0071052 A1 | 3/2010 | Mao et al. |
| 2010/0082503 A1 | 4/2010 | Kantak et al. |
| 2010/0106730 A1 | 4/2010 | Aminian et al. |
| 2010/0119053 A1 | 5/2010 | Goeldi |
| 2010/0121707 A1 | 5/2010 | Goeldi |
| 2010/0121843 A1 | 5/2010 | Goeldi |
| 2010/0153516 A1 | 6/2010 | Weinberg et al. |
| 2010/0169148 A1 | 7/2010 | Oberhofer et al. |
| 2010/0174813 A1 | 7/2010 | Hildreth et al. |
| 2010/0205663 A1 | 8/2010 | Ward et al. |
| 2010/0223341 A1 | 9/2010 | Manolescu et al. |
| 2010/0246797 A1 | 9/2010 | Chavez et al. |
| 2010/0250683 A1 | 9/2010 | Hoyne et al. |
| 2010/0257117 A1 | 10/2010 | Shvadron et al. |
| 2010/0274732 A1 | 10/2010 | Grinchenko et al. |
| 2010/0281258 A1 | 11/2010 | Andress et al. |
| 2010/0287512 A1 | 11/2010 | Gan et al. |
| 2010/0293560 A1 | 11/2010 | Bland et al. |
| 2010/0306122 A1 | 12/2010 | Shaffer |
| 2010/0306528 A1 | 12/2010 | Andress et al. |
| 2010/0312769 A1 | 12/2010 | Bailey et al. |
| 2011/0004922 A1 | 1/2011 | Bono et al. |
| 2011/0055217 A1 | 3/2011 | Kamel et al. |
| 2011/0055264 A1 | 3/2011 | Sundelin et al. |
| 2011/0077988 A1 | 3/2011 | Cates et al. |
| 2011/0113041 A1 | 5/2011 | Hawthorne et al. |
| 2011/0119593 A1 | 5/2011 | Jacobson et al. |
| 2011/0125826 A1 | 5/2011 | Erhart et al. |
| 2011/0144801 A1 | 6/2011 | Selker et al. |
| 2011/0153603 A1 | 6/2011 | Adiba et al. |
| 2011/0197146 A1 | 8/2011 | Goto et al. |
| 2011/0212430 A1 | 9/2011 | Smithmier et al. |
| 2011/0219087 A1 | 9/2011 | Jorasch et al. |
| 2011/0246513 A1 | 10/2011 | Covannon et al. |
| 2011/0283366 A1 | 11/2011 | Kwon et al. |
| 2011/0289574 A1 | 11/2011 | Hull et al. |
| 2011/0302653 A1 | 12/2011 | Frantz et al. |
| 2012/0036080 A1 | 2/2012 | Singer et al. |
| 2012/0054135 A1 | 3/2012 | Salaka et al. |
| 2012/0076367 A1 | 3/2012 | Tseng |
| 2012/0077158 A1 | 3/2012 | Jastrzembski et al. |
| 2012/0089706 A1 | 4/2012 | Collins et al. |
| 2012/0095861 A1 | 4/2012 | Feng et al. |
| 2012/0102021 A1 | 4/2012 | Hill et al. |
| 2012/0117059 A1 | 5/2012 | Bailey et al. |
| 2012/0131653 A1 | 5/2012 | Pasquero et al. |
| 2012/0150759 A1 | 6/2012 | Tarjan |
| 2012/0158632 A1 | 6/2012 | Grenier et al. |
| 2012/0195422 A1 | 8/2012 | Famous |
| 2012/0198197 A1 | 8/2012 | Gladwin et al. |
| 2012/0208568 A1 | 8/2012 | Cooley |
| 2012/0210119 A1 | 8/2012 | Baxter et al. |
| 2012/0232953 A1 | 9/2012 | Custer |
| 2012/0254321 A1 | 10/2012 | Lindsay et al. |
| 2012/0265806 A1 | 10/2012 | Blanchflower et al. |
| 2012/0271729 A1 | 10/2012 | Vincelette et al. |
| 2012/0284155 A1 | 11/2012 | Holten et al. |
| 2012/0290605 A1 | 11/2012 | Ickman et al. |
| 2012/0303659 A1 | 11/2012 | Erhart et al. |
| 2012/0317198 A1 | 12/2012 | Patton et al. |
| 2013/0006403 A1 | 1/2013 | Moore et al. |
| 2013/0007121 A1 | 1/2013 | Fontenot et al. |
| 2013/0018957 A1 | 1/2013 | Parnaby et al. |
| 2013/0024522 A1 | 1/2013 | Pierre et al. |
| 2013/0050747 A1 | 2/2013 | Cok et al. |
| 2013/0066876 A1 | 3/2013 | Raskino et al. |
| 2013/0110946 A1 | 5/2013 | Bradshaw |
| 2013/0116044 A1 | 5/2013 | Schwartz |
| 2013/0126042 A1 | 5/2013 | Dewald et al. |
| 2013/0138428 A1 | 5/2013 | Chandramouli et al. |
| 2013/0138742 A1 | 5/2013 | Dziubinski |
| 2013/0159472 A1 | 6/2013 | Newton et al. |
| 2013/0198260 A1 | 8/2013 | Dow et al. |
| 2013/0212349 A1 | 8/2013 | Maruyama |
| 2013/0218801 A1 | 8/2013 | Rago |
| 2013/0218865 A1 | 8/2013 | Angulo et al. |
| 2013/0235069 A1 | 9/2013 | Ubillos et al. |
| 2013/0282417 A1 | 10/2013 | Gaedcke et al. |
| 2013/0282594 A1 | 10/2013 | Gaedcke et al. |
| 2013/0282603 A1 | 10/2013 | Gaedcke et al. |
| 2013/0282722 A1 | 10/2013 | Grenier et al. |
| 2013/0291058 A1 | 10/2013 | Wollenstein et al. |
| 2013/0298038 A1 | 11/2013 | Spivack et al. |
| 2013/0304726 A1 | 11/2013 | Sandulescu et al. |
| 2013/0304758 A1 | 11/2013 | Gruber et al. |
| 2013/0318156 A1 | 11/2013 | Friedman et al. |
| 2013/0332262 A1 | 12/2013 | Hunt et al. |
| 2013/0332263 A1 | 12/2013 | Vora et al. |
| 2013/0346872 A1 | 12/2013 | Scott et al. |
| 2014/0006524 A1 | 1/2014 | Singh et al. |
| 2014/0032306 A1 | 1/2014 | Sukornyk et al. |
| 2014/0040275 A1 | 2/2014 | Dang et al. |
| 2014/0040377 A1 | 2/2014 | Friedman et al. |
| 2014/0040993 A1 | 2/2014 | Lorenzo et al. |
| 2014/0047429 A1 | 2/2014 | Gaither et al. |
| 2014/0067520 A1 | 3/2014 | Campanile |
| 2014/0074844 A1 | 3/2014 | Subramanian et al. |
| 2014/0075004 A1 | 3/2014 | Dusen et al. |
| 2014/0082072 A1 | 3/2014 | Kass et al. |
| 2014/0108675 A1 | 4/2014 | Wu |
| 2014/0164352 A1 | 6/2014 | Denninghoff |
| 2014/0173444 A1 | 6/2014 | Wu |
| 2014/0173501 A1 | 6/2014 | Wu |
| 2014/0173509 A1 | 6/2014 | Wu |
| 2014/0181087 A1 | 6/2014 | Wu |
| 2014/0181194 A1 | 6/2014 | Sullivan |
| 2014/0181728 A1 | 6/2014 | Wu |
| 2014/0184841 A1 | 7/2014 | Woo et al. |
| 2014/0189808 A1 | 7/2014 | Mahaffey et al. |
| 2014/0200989 A1 | 7/2014 | Kassko et al. |
| 2014/0222834 A1 | 8/2014 | Parikh et al. |
| 2014/0223527 A1 | 8/2014 | Bortz et al. |
| 2014/0244621 A1 | 8/2014 | Lindsay |
| 2014/0278785 A1 | 9/2014 | Gaedcke et al. |

(56) References Cited

U.S. PATENT DOCUMENTS

| | | |
|---|---|---|
| 2014/0280113 A1 | 9/2014 | Hohwald |
| 2014/0280398 A1 | 9/2014 | Smith et al. |
| 2014/0289034 A1 | 9/2014 | Wu |
| 2014/0298199 A1 | 10/2014 | Johnson, Jr. et al. |
| 2014/0304249 A1 | 10/2014 | Ayzenshtat et al. |
| 2014/0324902 A1 | 10/2014 | Morris et al. |
| 2014/0337953 A1 | 11/2014 | Banatwala et al. |
| 2014/0358911 A1 | 12/2014 | McCarthy et al. |
| 2015/0006708 A1 | 1/2015 | Banke et al. |
| 2015/0032492 A1 | 1/2015 | Ting et al. |
| 2015/0032751 A1 | 1/2015 | Ting et al. |
| 2015/0039705 A1 | 2/2015 | Kursun |
| 2015/0067160 A1 | 3/2015 | Sridhar et al. |
| 2015/0095307 A1 | 4/2015 | Bensberg et al. |
| 2015/0100537 A1 | 4/2015 | Grieves et al. |
| 2015/0112918 A1 | 4/2015 | Zheng et al. |
| 2015/0120713 A1 | 4/2015 | Kim et al. |
| 2015/0127453 A1 | 5/2015 | Tew et al. |
| 2015/0134457 A1 | 5/2015 | Cheung et al. |
| 2015/0134579 A1 | 5/2015 | Zaman et al. |
| 2015/0142748 A1 | 5/2015 | Gottemukkula et al. |
| 2015/0161211 A1 | 6/2015 | Patel et al. |
| 2015/0170294 A1 | 6/2015 | Goyal et al. |
| 2015/0188907 A1 | 7/2015 | Khalid et al. |
| 2015/0193504 A1 | 7/2015 | Naidu et al. |
| 2015/0244706 A1 | 8/2015 | Grajek et al. |
| 2015/0281227 A1 | 10/2015 | Ivey et al. |
| 2015/0286643 A1 | 10/2015 | Kumar et al. |
| 2015/0288522 A1 | 10/2015 | McCoy et al. |
| 2015/0295869 A1 | 10/2015 | Li et al. |
| 2015/0310018 A1 | 10/2015 | Fan et al. |
| 2015/0310020 A1 | 10/2015 | Brav et al. |
| 2015/0310571 A1 | 10/2015 | Brav et al. |
| 2015/0312200 A1 | 10/2015 | Brav et al. |
| 2015/0334102 A1 | 11/2015 | Haugsnes |
| 2015/0347616 A1 | 12/2015 | Levi et al. |
| 2015/0381552 A1 | 12/2015 | Vijay et al. |
| 2016/0019628 A1 | 1/2016 | Udumudi et al. |
| 2016/0021097 A1 | 1/2016 | Shrotri |
| 2016/0034551 A1 | 2/2016 | Huang et al. |
| 2016/0042053 A1 | 2/2016 | Webber |
| 2016/0055250 A1 | 2/2016 | Rush |
| 2016/0055541 A1 | 2/2016 | Calistri-Yeh |
| 2016/0057576 A1 | 2/2016 | Kessler et al. |
| 2016/0073166 A1 | 3/2016 | Hu et al. |
| 2016/0080445 A1 | 3/2016 | Kazerani et al. |
| 2016/0110688 A1 | 4/2016 | Knox et al. |
| 2016/0125157 A1 | 5/2016 | Wu |
| 2016/0132904 A1 | 5/2016 | Mondal et al. |
| 2016/0132973 A1 | 5/2016 | Wu |
| 2016/0134580 A1 | 5/2016 | Castera et al. |
| 2016/0147760 A1 | 5/2016 | Anandhavelu et al. |
| 2016/0151704 A1 | 6/2016 | Wu |
| 2016/0164863 A1 | 6/2016 | Hitchcock et al. |
| 2016/0203221 A1 | 7/2016 | Rao et al. |
| 2016/0203523 A1 | 7/2016 | Spasojevic et al. |
| 2016/0210555 A1 | 7/2016 | Murphy et al. |
| 2016/0212100 A1 | 7/2016 | Banerjee |
| 2016/0218997 A1* | 7/2016 | Patil ...................... G06F 40/274 |
| 2016/0255034 A1 | 9/2016 | Yuan |
| 2016/0269344 A1 | 9/2016 | Anders et al. |
| 2016/0320926 A1 | 11/2016 | Ganin et al. |
| 2016/0321261 A1 | 11/2016 | Spasojevic et al. |
| 2016/0321562 A1 | 11/2016 | Zeng |
| 2016/0321694 A1 | 11/2016 | Vorozhtsov |
| 2016/0335572 A1 | 11/2016 | Bennett et al. |
| 2016/0352667 A1 | 12/2016 | Pickett et al. |
| 2017/0046112 A1 | 2/2017 | Keller et al. |
| 2017/0048237 A1 | 2/2017 | Pfitzmann et al. |
| 2017/0061248 A1 | 3/2017 | Ryan, Jr. et al. |
| 2017/0132276 A1 | 5/2017 | Saurabh et al. |
| 2017/0154356 A1 | 6/2017 | Trevisiol et al. |
| 2017/0154366 A1 | 6/2017 | Turgeman |
| 2017/0177562 A1 | 6/2017 | Scott et al. |
| 2017/0180294 A1 | 6/2017 | Milligan et al. |
| 2017/0193546 A1 | 7/2017 | Bennett et al. |
| 2017/0255536 A1 | 9/2017 | Weissinger et al. |
| 2017/0264619 A1 | 9/2017 | Narayanaswamy et al. |
| 2017/0300490 A1 | 10/2017 | Kachemir et al. |
| 2017/0344748 A1 | 11/2017 | Ghani et al. |
| 2017/0366636 A1 | 12/2017 | Wang et al. |
| 2018/0027075 A1 | 1/2018 | Schoeffler et al. |
| 2018/0041336 A1 | 2/2018 | Keshava et al. |
| 2018/0053114 A1 | 2/2018 | Adjaoute |
| 2018/0081983 A1 | 3/2018 | Carru et al. |
| 2018/0091468 A1 | 3/2018 | Yong et al. |
| 2018/0097802 A1 | 4/2018 | Lander et al. |
| 2018/0115473 A1 | 4/2018 | Sridhar et al. |
| 2018/0144389 A1 | 5/2018 | Fredrich et al. |
| 2018/0152471 A1 | 5/2018 | Jakobsson |
| 2018/0211285 A1 | 7/2018 | Todasco et al. |
| 2018/0219830 A1 | 8/2018 | O'Brien et al. |
| 2018/0267951 A1 | 9/2018 | Moah et al. |
| 2018/0278503 A1 | 9/2018 | Carey et al. |
| 2018/0293607 A1 | 10/2018 | Huddleston et al. |
| 2018/0295137 A1 | 10/2018 | Zager et al. |
| 2018/0329565 A1 | 11/2018 | Yeung et al. |
| 2018/0332079 A1 | 11/2018 | Ashley et al. |
| 2018/0337871 A1 | 11/2018 | Matta et al. |
| 2018/0337907 A1 | 11/2018 | Bhansali et al. |
| 2018/0337910 A1 | 11/2018 | Gustavson et al. |
| 2018/0367484 A1 | 12/2018 | Rodriguez et al. |
| 2018/0374374 A1 | 12/2018 | Watson et al. |
| 2019/0057204 A1 | 2/2019 | Marcovecchio et al. |
| 2019/0114356 A1 | 4/2019 | Senftleber et al. |
| 2019/0116137 A1 | 4/2019 | Senftleber et al. |
| 2019/0116148 A1 | 4/2019 | Senftleber et al. |
| 2019/0158610 A1 | 5/2019 | Holzband et al. |
| 2019/0159166 A1 | 5/2019 | Aggarwal et al. |
| 2019/0228093 A1 | 7/2019 | Falcao et al. |
| 2019/0230151 A1 | 7/2019 | Falcao et al. |
| 2019/0245751 A1 | 8/2019 | Wong |
| 2019/0306248 A1 | 10/2019 | Swarangi et al. |
| 2019/0347984 A1 | 11/2019 | Hintermeister |
| 2019/0354709 A1 | 11/2019 | Brinskelle |
| 2020/0007530 A1 | 1/2020 | Abdul et al. |
| 2020/0051120 A1 | 2/2020 | Senftleber et al. |
| 2020/0053094 A1 | 2/2020 | Kaube et al. |
| 2020/0099676 A1 | 3/2020 | Desarda et al. |
| 2020/0104478 A1 | 4/2020 | Chauhan |
| 2020/0120068 A1 | 4/2020 | Senftleber et al. |
| 2020/0120095 A1 | 4/2020 | Senftleber et al. |
| 2020/0120096 A1 | 4/2020 | Senftleber et al. |
| 2020/0120167 A1 | 4/2020 | Senftleber et al. |
| 2020/0151829 A1 | 5/2020 | Wu |
| 2020/0184575 A1 | 6/2020 | Gaedcke et al. |
| 2020/0258091 A1 | 8/2020 | Gaedcke et al. |
| 2020/0287957 A1 | 9/2020 | Falcao et al. |
| 2020/0329110 A1 | 10/2020 | Holzband et al. |
| 2020/0358755 A1 | 11/2020 | Abdul et al. |
| 2020/0366564 A1 | 11/2020 | Davis et al. |
| 2021/0119967 A1 | 4/2021 | Senftleber et al. |
| 2021/0174391 A1 | 6/2021 | Savage et al. |
| 2021/0176136 A1 | 6/2021 | Davis et al. |
| 2021/0226952 A1 | 7/2021 | Senftleber et al. |
| 2021/0250341 A1 | 8/2021 | Senftleber et al. |
| 2021/0256041 A1 | 8/2021 | Senftleber et al. |
| 2021/0312319 A1* | 10/2021 | Levchenko ............ G06N 20/00 |
| 2021/0328961 A1 | 10/2021 | Senftleber et al. |
| 2021/0357408 A1 | 11/2021 | Falcao et al. |
| 2022/0150188 A1* | 5/2022 | Cotner .................... H04L 63/04 |
| 2022/0247700 A1* | 8/2022 | Bhardwaj ............. H04L 51/046 |

FOREIGN PATENT DOCUMENTS

| | | | |
|---|---|---|---|
| EP | 2857993 B1 | 8/2017 | |
| EP | 3933701 A1 * | 1/2022 | ............ G06N 20/00 |
| EP | 3754912 B1 * | 4/2022 | ............ H04L 51/02 |
| WO | 2009047674 A2 | 4/2009 | |
| WO | 2013158839 A1 | 10/2013 | |
| WO | 2014089460 A2 | 6/2014 | |
| WO | 2014153463 A3 | 1/2015 | |
| WO | 2015013436 A2 | 1/2015 | |

(56) References Cited

FOREIGN PATENT DOCUMENTS

| WO | 2019075284 A2 | 4/2019 |
|---|---|---|
| WO | 2019144159 A1 | 7/2019 |
| WO | 2020232311 A1 | 11/2020 |

OTHER PUBLICATIONS

Ahmed, Saba, Final Office Action dated Jun. 29, 2016 for U.S. Appl. No. 14/098,492.
Ahmed, Saba, Non-Final Office Action dated Nov. 19, 2015 for U.S. Appl. No. 14/098,492.
Anicas, Mitchell; An Introduction to OAuth 2, DigitalOcean, Published Jul. 21, 2014, Retrieved Jan. 29, 2021; URL: https://www.digitalocean.com/community/tutorials/an-introduction-to-oauth-2#oauth-roles.
Antoniades et al., "we.b: The web of short URLs," Apr. 2011, Proceedings of the 20th International Conference on World Wide Web, Mar. 28-Apr. 1, 2011, Hyderabad, India, pp. 715-724 (Year: 2011).
Arentz et al., Classifying offensive sites based on image content [online], Computer Vision and Image Understanding 94, 295-310, 2004, Retrieved from the Internet: https://www.sciencedirect.com/science/article/abs/pii/S1077314203001875.
Bista, Sanat Kumar et al., "Using Gamification in an Online Community," CSIRO ITC Centre, Conference Paper, 2012.
Blaufeld, Justin R., Final Office Action dated Mar. 24, 2016 for U.S. Appl. No. 14/098,501.
Blaufeld, Justin R., Non-Final Office Action dated Sep. 24, 2015 for U.S. Appl. No. 14/098,501.
Bostock, Mike, Sankey Diagram, available at http://bost.ocks.org/mike/sankey, published May 21, 2012, 1 pg.
Brown Jr., Nathan H., Final Office Action dated Mar. 29, 2011 for U.S. Appl. No. 11/971,856.
Brown Jr., Nathan H., Non-Final Office Action dated Jun. 6, 2012 for U.S. Appl. No. 13/167,482.
Brown Jr., Nathan H., Non-Final Office Action dated Mar. 24, 2014 for U.S. Appl. No. 13/780,487.
Brown Jr., Nathan H., Non-Final Office Action dated Nov. 26, 2010 for U.S. Appl. No. 11/971,856.
Bui, Hanh Thi Minh, Non-Final Office Action dated Mar. 13, 2015 for U.S. Appl. No. 14/012,978.
Cannell, Larry, "Windows 7 Federated Search and SharePoint 2010" online article dated Jun. 2010 <http://blogs.gartner.com/larry-cannell/2010/09/09/windows-7-federated-search-and-sharepoint-2010/[May 13, 2016 12:36:15 PM].
Chung, Mong-Shune, Non-Final Office Action dated Jan. 29, 2016 for U.S. Appl. No. 14/098,505.
Constine, Josh, "Facebook tests notification unsubscribe button for feed posts," Aug. 9, 2010. http://www.adweek.com/socialtime/unsubscribe-button-posts/244868.
Dagnew, Saba, Final Office Action dated Feb. 12, 2020 for U.S. Appl. No. 15/581,795.
Dagnew, Saba, Non-Final Office Action for U.S. Appl. No. 15/581,795 dated Sep. 16, 2019.
Dinh, Khanh Q., Non-Final Office Action dated Mar. 17, 2021 for U.S. Appl. No. 16/820,697.
Dinh, Khanh Q., Notice of Allowance and Fee(s) Due dated Apr. 16, 2021 for U.S. Appl. No. 16/820,697.
Dinh, Khanh Q., Notice of Allowance and Fee(s) Due dated Oct. 29, 2019 for U.S. Appl. No. 15/877,379.
Dwyer, Cameron, "Five out-of-the-box ways to get Email into SharePoint" Jan. 2012, <https://camerondwyer.wordpress.com/2012/09/04/five-out-of-the-box-ways-to-get-email-into-sharepoint/[May 13, 2016 10:48:43 AM].
Emojipedia, (https://web.archive.org/web/20150915110235/https://emojipedia.org/fisted-hand-sign/), Date: Sep. 15, 2015; (https://web.archive.org/web/20150823012626/https://emojipedia.org/clapping-hands-sign/), Date: Aug. 23, 2015; (https://web.archive.org/web/20150829090848/https://emojipedia.org/smiling-face-with-sunglasses/), Date: Aug. 29, 2015.
Falcao et al., U.S. Appl. No. 15/877,379, filed Jan. 22, 2018 and entitled, "Temporal Optimization of Data Operations Using Distributed Search and Server Management."
Falcao et al., U.S. Appl. No. 15/877,381, filed Jan. 22, 2018 and entitled, "Temporal Optimization of Data Operations Using Distributed Search and Server Management."
Fett et al., The Web SSO Standard OpenID Connect: In-Depth Formal Security Analysis and Security Guidelines, 2017 IEEE 30th Computer Security Foundations Symposium (Year: 2017).
Filipczyk, Marcin R., Final Office Action dated Oct. 5, 2015 for U.S. Appl. No. 13/950,268.
Filipczyk, Marcin R., Non-Final Office Action dated Mar. 10, 2016 for U.S. Appl. No. 13/950,268.
Filipczyk, Marcin R., Non-Final Office action dated May 22, 2015 for U.S. Appl. No. 13/950,268.
Fiorillo, James N., Final Office Action dated Sep. 27, 2021 for U.S. Appl. No. 16/827,625.
Fiorillo, James N., Non-Final Office Action for U.S. Appl. No. 15/821,543 dated Aug. 16, 2019.
Fiorillo, James N., Non-Final Office Action dated Jun. 7, 2021 for U.S. Appl. No. 16/827,625.
Fiorillo, James N., Notice of Allowance and Fee(s) Due dated Nov. 14, 2019 for U.S. Appl. No. 15/821,543.
Friedman et al., U.S. Appl. No. 61/650,849, filed May 23, 2012 and entitled, "Dynamic Information Streams in a Social Network Platform."
Frunzi, Victoria E., Final Office Action dated May 17, 2021 for U.S. Appl. No. 16/590,218.
Frunzi, Victoria E., Non-Final Office Action dated Dec. 21, 2020 for U.S. Appl. No. 16/590,218.
Frunzi, Victoria E., Non-Final Office Action dated Oct. 16, 2018 for U.S. Appl. No. 15/018,787.
Gaedckle et al., U.S. Appl. No. 61/636,132, filed Apr. 20, 2012 and entitled, "System and Method for Providing a Social Customer Care System."
Georgandellis, Andrew C., Final Office Action dated Mar. 30, 2016 for U.S. Appl. No. 13/900,878.
Goldberg, Ivan R., Non-Final Office Action dated Jun. 20, 2014 for U.S. Appl. No. 13/865,411.
Goldberg, Ivan R., Non-Final Office Action dated Jun. 23, 2014 for U.S. Appl. No. 13/865,429.
Goldberg, Ivan R., Non-Final Office Action dated Mar. 10, 2021 for U.S. Appl. No. 16/695,098.
Goldberg, Ivan R., Non-Final Office Action dated Mar. 3, 2021 for U.S. Appl. No. 16/701,143.
Hardt, Dick, The OAuth 2.0 Authorization Framework draft-ieft-oauth-v2-31; Internet Engineering Task Force (IEFT) (Year: 2012).
Hashemi, Mazdak, "The Infrastructure Behind Twitter: Scale", Jan. 19, 2017, Twitter, Inc. Blog Post, https://blog.twitter.com/engineering/en_us/topics/infrastructure/2017/the-infrastructure-behind-twitter-scale.html.
Hatcher, Deirdre D., Non-Final Office Action dated Jan. 14, 2016 for U.S. Appl. No. 13/950,258.
Holzband et al., U.S. Appl. No. 15/821,543, filed Nov. 22, 2017 and entitled, "Responsive Action Prediction Based on Electronic Messages Among a System of Networked Computing Devices."
Jang, Gijeong, Written Opinion of the International Searching Authority and International Search Report dated Jul. 28, 2015 for International Patent Application No. PCT/US2014/047866.
Jou et al., "Predicting Viewer Perceived Emotions in Animated GIFs", Nov. 3-7, 2014 (4 pages).
Kim, Harry C., Notification of Transmittal of the International Search Report and the Written Opinion of the International Searching Authority, or the Declaration dated Sep. 16, 2020 for International Patent Application No. PCT/US2020/032999.
Kolosowski-Gager, Katherine, Final Office Action dated Feb. 11, 2019 for U.S. Appl. No. 14/627,151.
Kolosowski-Gager, Katherine, Non-Final Office Action dated Jun. 29, 2018 for U.S. Appl. No. 14/627,151.

(56) References Cited

OTHER PUBLICATIONS

Leimeister et al., "Success factors of virtual communities from the perspective of members and operators: An empirical study," Proceedings of the 37th Hawaii International Conference on Systems Sciences 2004, IEEE, pp. 1-10 (Year: 2004).
Lithium Technologies. "Community Health Index for Online Communities." 2009, https://www.lithium.com/pdfs/whitepapers/Lithium-Community-Health-Index_v1AY2ULb.pdf. Retrieved from the Internet Wayback Machine, dated Feb. 19, 2011.
Lithium Website, http://www.lithium.com, Dec. 11, 2010, retrieved from Internet Archive, pp. 1-9.
Liu et al., OAuth Based Authentication and Authorization in Open Telco API; International Conference on Computer Science and Electronics Engineering, 2012 (Year: 2012).
M. Rowe and H. Alani, "What Makes Communities Tick? Community Health Analysis Using Role Compositions," 2012 International Conference on Privacy, Security, Risk and Trust and 2012 International Conference on Social Computing, Amsterdam, Netherlands, 2012, pp. 267-276, doing:10.1109/SocialCom-PASSAT2012.18.
M2 PressWire, "Alterian: Social media monitoring and analytics comes of age with Alterian's acquisition of market leader Techrigy," Jul. 15, 2009, Anonymous, Norman Media Ltd, London.
Matthews, Tara, et al. "Community Insights: Helping Community Leaders Enhance the Value of Enterprise Online Communities." Proceedings of the SIGCHI Conference on Human Factors in Computing Systems, Apr. 27-May 2, 2013, Paris, France. ACM (2013). pp. 513-522.
Meng, Jau Shya, Non-Final Office Action dated Jan. 3, 2020 for U.S. Appl. No. 15/877,381.
Meng, Jau Shya, Non-Final Office Action dated Jun. 16, 2020 for U.S. Appl. No. 15/877,381.
Mesa, Joel, Final Office Action dated Mar. 30, 2020 for U.S. Appl. No. 15/782,635.
Mesa, Joel, Non-Final Office Action for U.S. Appl. No. 15/782,635 dated Oct. 4, 2019.
Mesa, Joel, Non-Final Office Action dated Oct. 6, 2020 for U.S. Appl. No. 15/782,635.
Mesa, Joel, Notice of Allowance and Fee(s) Due dated Feb. 24, 2021 for U.S. Appl. No. 15/782,635.
Mosley, Kyle T., Non-Final Office Action dated Dec. 28, 2017 for U.S. Appl. No. 14/852,965.
Mosley, Kyle T., Non-Final Office Action dated Oct. 4, 2017 for U.S. Appl. No. 14/627,151.
Nano, Sargon N., Notice of Allowance and Fee(s) Due dated May 19, 2021 for U.S. Appl. No. 17/026,152.
Netzloff, Eric R., Non-Final Office Action dated Nov. 25, 2014 for U.S. Appl. No. 13/848,706.
Netzloff, Eric R., Non-Final Office Action dated Nov. 6, 2018 for U.S. Appl. No. 14/824,021.
Neuman, Clifford B., Proxy-Based Authorization and Accounting for Distributed Systems, IEEE 1993 (Year: 1993).
Niruntasukrat et al., Authorization Mechanism for MQTT-based Internet of Things, IEEE ICC 2016 Workshops: W07—Workshop on Convergent Internet of Things (Year: 2016).
Ofori-Awuah, Maame, Final Office Action dated Oct. 2, 2020 for U.S. Appl. No. 14/929,209.
Ofori-Awuah, Maame, Final Office Action dated Sep. 6, 2019 for U.S. Appl. No. 14/929,209.
Ofori-Awuah, Maame, Non-Final Office Action dated Apr. 5, 2019 for U.S. Appl. No. 14/929,209.
Ofori-Awuah, Maame, Non-Final Office Action dated Sep. 28, 2021 for U.S. Appl. No. 14/929,209.
Oh, Eung Gie, Written Opinion of the International Searching Authority and International Search Report dated Nov. 18, 2014 for International Patent Application No. PCT/US2014/031345.
Olshannikov, Alex, Final Office Action dated Apr. 15, 2016 for U.S. Appl. No. 14/098,480.
Olshannikov, Alex, Final Office Action dated Feb. 17, 2016 for U.S. Appl. No. 14/098,509.
Olshannikov, Alex, Non-Final Office Action dated Nov. 5, 2015 for U.S. Appl. No. 14/098,480.
Olshannikov, Alex, Non-Final Office Action dated Oct. 22, 2015 for U.S. Appl. No. 14/098,509.
Perungavoor, Venkatanaray, Notice of Allowance and Fee(s) Due for U.S. Appl. No. 16/158,167, dated May 15, 2020.
Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.
Rao et al., U.S. Appl. No. 62/049,642, filed Sep. 12, 2014 and entitled, "System and Apparatus for an Application Agnostic User Search Engine."
Rashid, Ishrat, Final Office Action for U.S. Appl. No. 15/782,653 dated Sep. 19, 2019.
Rashid, Ishrat, Final Office Action dated Jun. 15, 2021 for U.S. Appl. No. 15/782,653.
Rashid, Ishrat, Non-Final Office Action dated Apr. 2, 2021 for U.S. Appl. No. 15/782,653.
Rashid, Ishrat, Non-Final Office Action dated Jun. 11, 2019 for U.S. Appl. No. 15/782,653.
Rashid, Ishrat, Non-Final Office Action dated Jun. 12, 2020 for U.S. Appl. No. 15/782,653.
Senftleber et al., International (PCT) Patent Application No. PCT/US2018/055545, filed Oct. 12, 2018 and entitled, "Predicting Performance of Content and Electronic Messages Among a System of Networked Computing Devices."
Senftleber et al., U.S. Appl. No. 15/782,635, filed Oct. 12, 2017 and entitled, "Computerized Tools to Enhance Speed and Propagation of Content in Electronic Messages Among a System of Networked Computing Devices."
Senftleber et al., U.S. Appl. No. 15/782,642, filed Oct. 12, 2017 and entitled, "Predicting Performance of Content and Electronic Messages Among a System of Networked Computing Devices."
Senftleber et al., U.S. Appl. No. 15/782,653, filed Oct. 12, 2017 and entitled, "Optimizing Effectiveness of Content in Electronic Messages Among a System of Networked Computing Device."
Senftleber et al., U.S. Appl. No. 16/158,167, filed Oct. 11, 2018 and entitled, "Credential and Authentication Management in Scalable Data Networks."
Senftleber et al., U.S. Appl. No. 16/158,169, filed Oct. 11, 2018 and entitled, "Native Activity Tracking Using Credential and Authentication Management in Scalable Data Networks."
Senftleber et al., U.S. Appl. No. 16/158,172, filed Oct. 11, 2018 and entitled, "Proxied Multi-Factor Authentication Using Credential and Authentication Management in Scalable Data Networks."
Senftleber et al., U.S. Appl. No. 16/194,126, filed Nov. 16, 2018 and entitled, "Multiplexed Data Exchange Portal Interface in Scalable Data Networks."
Shaw, Robert A., Final Office Action dated Mar. 16, 2021 for U.S. Appl. No. 16/158,169.
Shaw, Robert A., Non-Final Office Action dated Jan. 22, 2021 for U.S. Appl. No. 16/158,169.
Singh, Amardeep, IP Australia, Examination Report No. 1 for Australia Patent Application No. 2019209542 dated Dec. 17, 2020.
Spasojevic et al., U.S. Appl. No. 61/943,047, filed Feb. 21, 2014 and entitled, "Domain Generic Large Scale Topic Expertise & Interest Mining Across Multiple Online Social Networks."
Spasojevic, Nemanja et al., "When-To-Post on Social Networks", International Conference on Knowledge Discovery and Data Mining (KDD), Aug. 10-13, 2015, pp. 2127-2136, Retrieved Online: http://dl.acm.org/citation.cfm?d=2788584.
Suh, Andrew, Final Office Action dated Dec. 3, 2020 for U.S. Appl. No. 16/158,172.
Suh, Andrew, Non-Final Office Action dated Jul. 8, 2020 for U.S. Appl. No. 16/158,172.
Tabor, Amare F., Final Office Action dated Apr. 8, 2015 for U.S. Appl. No. 13/871,076.
Tabor, Amare F., Non-Final Office Action dated Aug. 15, 2014 for U.S. Appl. No. 13/871,076.

(56) References Cited

OTHER PUBLICATIONS

Takesue, Masaru, An HTTP Extension for Secure Transfer of Confidential Data, 2009 IEEE International Conference on Networking, Architecture, and Storage, Hunan, 2009, pp. 101-108, doi: 10.1109/NAS.2009.21.
Thomas, Shane, Written Opinion of the International Searching Authority and International Search Report dated Aug. 16, 2013 for International Patent Application No. PCT/US2013/037107.
Trapanese, William C., Non-Final Office Action dated May 27, 2020 for U.S. Appl. No. 16/413,577.
U.S. Appl. No. 11/333,826, filed Jan. 17, 2006 and entitled, "Knowledge Filter".
U.S. Appl. No. 11/692,169, filed Mar. 27, 2007 and entitled, "Knowledge Filter".
U.S. Appl. No. 60/158,496, filed Oct. 8, 1999 and entitled, "Knowledge Filter".
U.S. Appl. No. 60/816,100, filed Jun. 22, 2006 and entitled, "Knowledge Filter".
U.S. Appl. No. 60/816,900, filed Jun. 26, 2006 and entitled, "Knowledge Filter".
Vo, Huyen X., Non-Final Office Action dated Mar. 15, 2019 for U.S. Appl. No. 15/782,642.
Vo, Huyen X., Non-Final Office Action dated Oct. 15, 2020 for U.S. Appl. No. 16/458,183.
Walsh, John B., Non-Final Office Action dated Mar. 24, 2017 for U.S. Appl. No. 14/702,696.
Wang, Xiaoqing, and Shannon Lantzy. "A Systematic Examination of Member Turnover and Online Community Health." Thirty Second International Conference on Information Systems, Shanghai (2011), pp. 1-11.
Wollenstein et al., U.S. Appl. No. 61/639,509, filed Apr. 27, 2012 and entitled, "Systems and Methods for Implementing Custom Privacy Settings."
Wu, Michael, U.S. Appl. No. 61/734,927, filed Dec. 7, 2012 and entitled, "Systems and Methods for Presenting Analytic Data."
Wu, Michael, U.S. Appl. No. 62/072,929, filed Oct. 30, 2014 and entitled, "Systems and Methods to Monitor Health of Online Social Communities."
Young, Lee W., Notification of Transmittal of the International Search Report and the Written Opinion of the International Searching Authority, or the Declaration, dated Apr. 1, 2019 for International Application No. PCT/US2018/05545.
Young, Lee W., Written Opinion of the International Searching Authority and International Search Report dated May 28, 2014 for International Patent Application No. PCT/US2013/073625.
Young, Lee W.; Notification of Transmittal of the International Search Report and the Written Opinion of the International Searching Authority, or the Declaration dated Jun. 24, 2019 for International Application No. PCT/US2019/014637.
Georgandellis, Andrew C., Final Office Action dated Oct. 26, 2017 for U.S. Appl. No. 13/900,878.
Georgandellis, Andrew C., Final Office Action dated Sep. 21, 2016 for U.S. Appl. No. 14/035,166.
Georgandellis, Andrew C., Non-Final Office Action dated Jan. 26, 2017 for U.S. Appl. No. 13/900,878.
Goldberg, Ivan R., Final Office Action dated Jan. 15, 2015 for U.S. Appl. No. 13/865,429.
Goldberg, Ivan R., Final Office Action dated Jun. 29, 2021 for U.S. Appl. No. 16/695,098.
Goldberg, Ivan R., Final Office Action dated Jun. 29, 2021 for U.S. Appl. No. 16/701,143.
Goldberg, Ivan R., Non-Final Office Action dated Apr. 13, 2016 for U.S. Appl. No. 13/865,429.
Goldberg, Ivan R., Non-Final Office Action dated Jun. 18, 2014 for U.S. Appl. No. 13/835,250.
Goldberg, Ivan R., Non-Final Office Action dated Jun. 18, 2014 for U.S. Appl. No. 13/835,502.
Georgandellis, Andrew C., Non-Final Office Action dated Jul. 11, 2016 for U.S. Appl. No. 14/035,166.
Georgandellis, Andrew C., Non-Final Office Action dated May 23, 2017 for U.S. Appl. No. 14/035,166.
Georgandellis, Andrew C., Non-Final Office Action dated Nov. 3, 2015 for U.S. Appl. No. 13/900,878.
Giphy, (https://web.archive.org/web/20140813065113/http://giphy.com/search/happy), Date: Aug. 13, 2014; https://web.archive.org/web20141231135329/https://giphy.com/upload, Date: Dec. 31, 2014; https://web.archive.org/web/20150919214012/http://giphy.com/create/upload, Date: Sep. 19, 2015.
Goldberg, Ivan R., Final Office Action dated Jan. 12, 2015 for U.S. Appl. No. 13/835,502.
Goldberg, Ivan R., Final Office Action dated Jan. 13, 2015 for U.S. Appl. No. 13/835,250.
European Patent Office, Extended European Search Report dated Nov. 12, 2021 for European Patent Application No. 19741372.7.
Fiorillo, James N., Notice of Allowance and Fee(s) Due dated Nov. 24, 2021 for U.S. Appl. No. 16/827,625.
Kim, Harry, Notification of Transmittal of the International Search Report and the Written Opinion of the International Searching Authority, or the Declaration, dated Jan. 11, 2022 for International Application No. PCT/US2021/050979.
Rashid, Ishrat, Non-Final Office Action dated Dec. 22, 2021 for U.S. Appl. No. 15/782,653.
Shaw, Robert A., Non-Final Office Action dated Dec. 27, 2021 for U.S. Appl. No. 16/158,169.

* cited by examiner

AUTOMATED RESPONSE ENGINE AND
FLOW CONFIGURED TO EXCHANGE
RESPONSIVE COMMUNICATION DATA VIA
AN OMNICHANNEL ELECTRONIC
COMMUNICATION CHANNEL
INDEPENDENT OF DATA SOURCE

FIELD

Various embodiments relate generally to data science and data analysis, computer software and systems, and control systems to provide a platform to implement automated responses to data representing electronic messages, among other things, and, more specifically, to a computing and data platform that implements logic to facilitate implementation of an automated predictive response computing system independent of electronic communication channel or payload of an electronic message payload, the automated predictive response computing system being configured to implement, for example, an automated voice-text response engine configured to build and adaptively implement conversational data flows based on, for example, classification of an electronic message and a predictive response.

BACKGROUND

Advances in computing hardware and software have fueled exponential growth in delivery of vast amounts of information due to increased improvements in computational and networking technologies. Also, advances in conventional data network technologies provide an ability to exchange increasing amounts of generated data via various electronic messaging platforms. Thus, improvements in computing hardware, software, network services, and storage have bolstered growth of Internet-based messaging applications, such as social networking platform-based messenger applications (or web-based chat data communications), especially in technological areas aimed at exchanging digital information concerning products and services expeditiously. As an example, various organizations and corporations (e.g., retailer sellers) may exchange information through any number of electronic messaging networks, including social media networks (e.g., Twitter®, Facebook Messenger™, Reddit™, etc.), as well as any user-generated communication (e.g., texting via SMS, or the like, or audio-based telephone calls, and the like), any of which may rely specific or proprietary channels of data communication whereby any of the channels may convey text data, voice data, image data, and any other data in disparate data formats. Such organizations and corporations aim generally to provide data and targeted content timely to users online to manage, for example, brand loyalty and reputation, and to enhance customer engagement.

Conventionally, some typical electronic messaging platforms are designed to implement "bot" or "chat bot" applications to provide quasi-computer-generated responses to on-line inquiries. However, traditional approaches are not well-suited to multiplex across different data protocols, different communication paths, different computing platforms, and the like. Hence, such applications generally are limited to communicate with a specific communication channel.

Also, traditional approaches to providing computer-generated responses to on-line inquiries may also implement a "bot" or "chat bot" application with limited functionality as to relevant responses. Consequently, traditional server architectures and processes that provide electronic messaging platforms may include redundancies that suboptimally may require redundant resources to create, implement, and deploy, among other things.

Thus, what is needed is a solution to overcome the deficiencies of the above-described approaches to generate automated responses predictively configured to exchange conversational data via any medium, such as voice data and text data, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Figure 1:
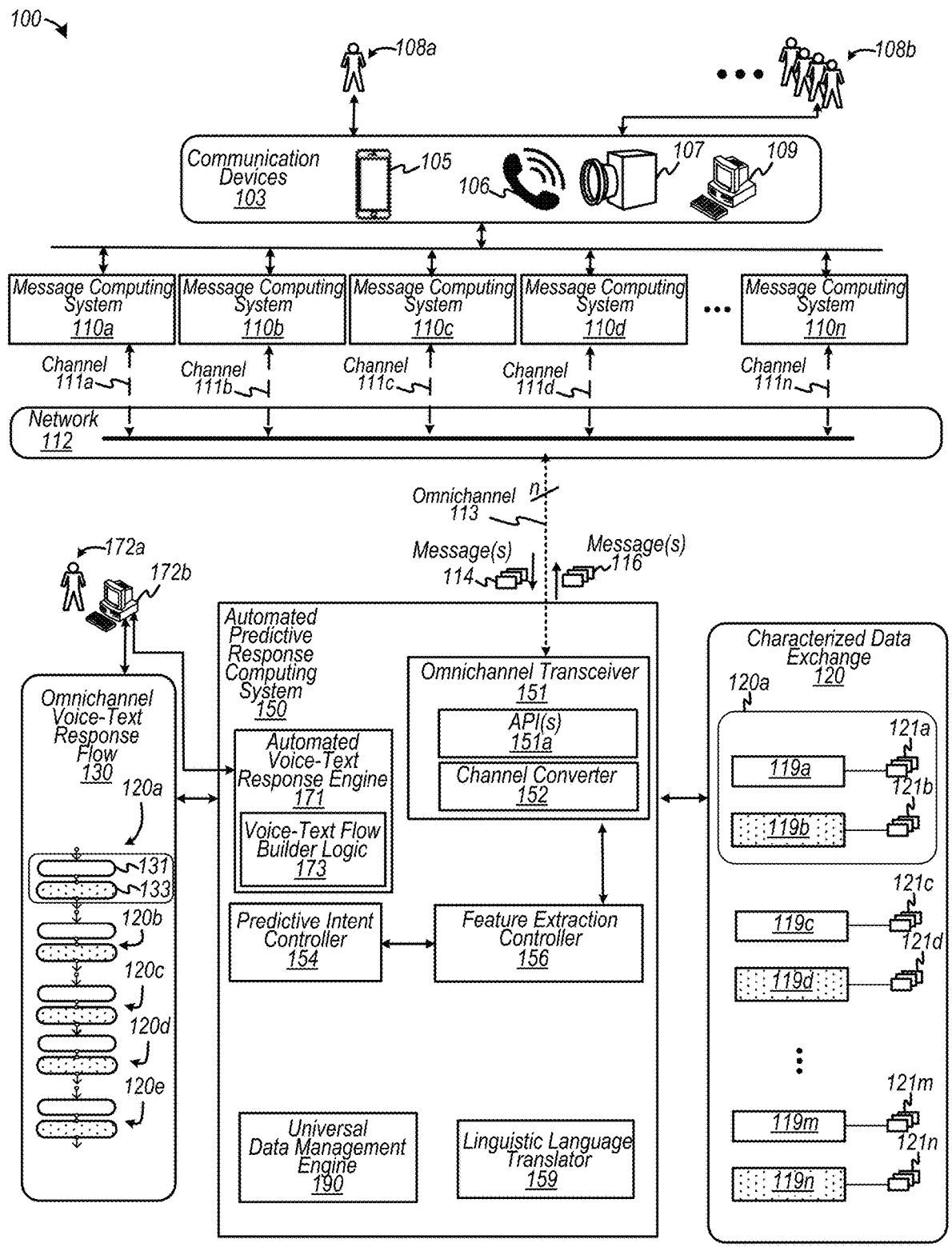
FIG. 1 is a diagram depicting an automated predictive response computing system configured to identify inbound voice data relative to other data to adapt a flow of electronic messages as a function of types of data conveyed via any disparate electronic communication channels, according to some embodiments.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in any arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description or providing unnecessary details that may be already known to those of ordinary skill in the art.

As used herein, "system" may refer to or include the description of a computer, network, or distributed computing system, topology, or architecture implementing hardware or software, or both, using various computing resources that are configured to provide computing features, functions, processes, elements, components, or parts, without any particular limitation as to the type, make, manufacturer, developer, provider, configuration, programming or formatting language, service, class, resource, specification, protocol, or other computing or network attributes. As used herein, "software" or "application" may also be used interchangeably or synonymously with, or refer to, a computer program, software, program, firmware, or any other term that may be used to describe, reference, or refer to a logical set of instructions that, when executed, performs a function or set of functions in association with a computing system or machine, regardless of whether physical, logical, or virtual and without restriction or limitation to any particular implementation, design, configuration, instance, or state. Further, "platform" may refer to any type of computer hardware (hereafter "hardware") or software, or any combination thereof, that may use one or more local, remote, distributed, networked, or computing cloud (hereafter "cloud")-based computing resources (e.g., computers, clients, servers, tablets, notebooks, smart phones, cell phones, mobile computing platforms or tablets, and the like) to provide an application, operating system, or other computing environment, such as those described herein, without restriction or limitation to any particular implementation, design, configuration, instance, or state. Distributed resources such as cloud computing networks (also referred to interchangeably as "computing clouds," "storage clouds," "cloud networks," or, simply, "clouds," without restriction or limitation to any particular implementation, design, configuration, instance, or state) may be used for processing and/or storage of varying quantities, types, structures, and formats of data, without restriction or limitation to any particular implementation, design, or configuration.

As used herein, data may be stored in various types of data structures including, but not limited to databases, data repositories, data warehouses, data stores, or other data structures or memory configured to store data in various computer programming languages and formats in accordance with various types of structured and unstructured database schemas such as SQL, MySQL, NoSQL, DynamoDB™, etc. Also applicable are computer programming languages and formats similar or equivalent to those developed by data facility and computing providers such as Amazon® Web Services, Inc. of Seattle, Wash., FMP, Oracle®, Salesforce.com, Inc., or others, without limitation or restriction to any particular instance or implementation. DynamoDB™, Amazon Elasticsearch Service, Amazon Kinesis Data Streams ("KDS")™, Amazon Kinesis Data Analytics, and the like, are examples of suitable technologies provide by Amazon Web Services ("AWS"). Another example of cloud computing services may include the Google® cloud platform that may implement a publisher-subscriber messaging service (e.g., Google® pub/sub architecture).

Further, references to databases, data structures, memory, or any type of data storage facility may include any embodiment as a local, remote, distributed, networked, cloud-based, or combined implementation thereof. For example, social networks and social media (e.g., "social media") using different types of devices may generate (i.e., in the form of posts (which is to be distinguished from a POST request or call over HTTP) on social networks and social media) data in different forms, formats, layouts, data transfer protocols, and data storage schema for presentation on different types of devices that use, modify, or store data for purposes such as electronic messaging, audio or video rendering (e.g., user-generated content, such as deployed on YouTube®), content sharing, or like purposes. Data may be generated in various formats such as text, audio, video (including three dimensional, augmented reality ("AR"), and virtual reality ("VR")), or others, without limitation, as electronic messages for use on social networks, social media, and social applications (e.g., "social media") such as Twitter® of San Francisco, Calif., Snapchat® as developed by Snap® of Venice, Calif., Messenger as developed by Facebook®, WhatsApp®, or Instagram® of Menlo Park, Calif., Pinterest® of San Francisco, Calif., LinkedIn® of Mountain View, Calif., and others, without limitation or restriction. In various embodiments, the term "content" may refer to, for example, one or more of executable instructions (e.g., of an application, a program, or any other code compatible with a programming language), textual data, image data, video data, audio data, or any other data.

In some examples, data may be formatted and transmitted via electronic messaging channels (i.e., transferred over one or more data communication protocols) between computing resources using various types of data communication and transfer protocols such as Hypertext Transfer Protocol ("HTTP"), Transmission Control Protocol ("TCP")/Internet Protocol ("IP"), Internet Relay Chat ("IRC"), SMS, text messaging, instant messaging ("IM"), File Transfer Protocol ("FTP"), or others, without limitation. As described herein, disclosed processes implemented as software may be programmed using Java®, JavaScript®, Scala, Python™, XML, HTML, and other data formats and programs, without limitation. Disclosed processes herein may also implement software such as Streaming SQL applications, browser applications (e.g., Firefox™) and/or web applications, among others. In some example, a browser application may implement a JavaScript framework, such as Ember.js, Meteor.js, ExtJS, AngularJS, and the like. References to various layers of an application architecture (e.g., application layer or data layer) may refer to a stacked layer application architecture such as the Open Systems Interconnect ("OSI") model or others. As described herein, a distributed data file may include executable instructions as described above (e.g., JavaScript® or the like) or any data constituting content (e.g., text data, video data, audio data, etc.), or both.

In some examples, systems, software, platforms, and computing clouds, or any combination thereof, may be implemented to facilitate online distribution of subsets of units of content, postings, electronic messages, and the like. In some cases, units of content, electronic postings, electronic messages, and the like may originate at social networks, social media, and social applications, or any other source of content.

FIG. 1 is a diagram depicting an automated predictive response computing system configured to identify inbound voice data relative to other data to adapt a flow of electronic messages as a function of types of data conveyed via any disparate electronic communication channels, according to some embodiments. Diagram 100 depicts an example of an automated predictive response computing system 150 configured to predictively identify data representing a response as a function of data in an electronic message independent of an electronic communication channel and its functionalities, and independent of data representing voice data (e.g., vocalized speech), text data (e.g., digitized text or written symbols), image data (e.g., images that may be identified through image recognition algorithms), or any other data that may originate from any of users 108a and 108b via computing devices 103. For example, any of users 108a and 108b may transmit requests in any data medium, such as text, audio, imagery, and the like, whereby such requests may include data representing requests for information, requests to purchase a product or service, requests for customer service or troubleshooting information, and the like. Automated predictive response computing system 150 may be configured to identify a nature of an electronic message (e.g., a request regarding a certain topic or intent), and may be further configured to provide automated responses to any of users 108a and 108b, as well as agent-assisted responses.

In various examples, any of users 108a or 108b may generate and transmit a request for information or for an action to be performed in association with automated predictive response computing system 150. Responsive to such requests, automated predictive response computing system 150 may be configured to identify subject matter of a message 114, such as an "intent of an electronic message," an "entity attribute of an electronic message," a topic of an electronic message, a "sentiment" or "affinity" level, a linguistic language of an electronic message, and other attributes that may be implemented to characterize exchanges of data, such as characterized data exchange 120, which, as depicted in diagram 100, may represent a conversational flow during which various successive or multiple user inquiries may be automatically received as electronic messages 114. In response to messages 114, automated predictive response computing system 150 may be configured to provide automated responses as electronic messages 116, or any other actions in furtherance of resolving an issue associated with any of messages 114. In various implementations, automated predictive response computing system 150 may be configured to generate or build an omnichannel voice-text response flow 130 that may be configured to facilitate data representing a conversational flow regardless of medium (e.g., regardless as to whether inbound or outbound data may include voice data, text data, image data, etc.), such as characterized data exchange 120. In some examples, automated predictive response computing system 150 may be implemented as an application, such as a customer care application (or any other application) developed and maintained by Khoros, LLC of Austin, Tex.

As shown in diagram 100, any of users 108a and 108b may communicate electronically via any of message computing systems 110a to 110n using any of communication devices 103. As an example, communication devices 103 may include a mobile computing device 105, a voice-based communication phone 106, an image generation device 107, such as a camera, a computing device 109, or any other electronic device configured to generate requests for information, actions, or any other outcome.

In various examples, message computing systems 110a to 110n may be configured to implement social networks, social media, and social applications (e.g., "social media") such as Twitter® of San Francisco, Calif., Reddit® of San Francisco, Calif., Snapchat® as developed by Snap® of Venice, Calif., Messenger services as developed by Facebook®, WhatsApp®, or Instagram® of Menlo Park, Calif., Pinterest® of San Francisco, Calif., LinkedIn® of Mountain View, Calif., Telegram Messenger™ of Telegram Messenger Inc. of the United Kingdom, Slack™ of Slack Technologies, Inc., and others, without limitation or restriction. Message computing systems 110a to 110n may be configured to generate and host any other type of digital content, such as email, image curation, voice calls (e.g., Voice over IP, or "VOIP"), text messaging (e.g., via SMS messaging, Multimedia Messaging Service ("MIMS"), WhatsApp™, WeChat™, Apple® Business Chat™, Instagram™ Direct Messenger, etc.), Twilio® SMS, and web pages configured to implement web chat functionality (e.g., news websites, retailer websites, etc.). Google® voice, Twilio™ voice, and other voice or telephony technology may be accessed or implemented as any of message computing systems 110a to 110n. Further, message computing systems 110a to 110n may be configured to provide image data and/or audio data, such as voice data to facilitate telephone calls. As an example, message computing systems 110a to 110n may be configured to implement Twilio Voice® or any other voice or telephony application.

Any of message computing systems 110a to 110n may implement various corresponding electronic communication channels 111a to 111n to exchange data via one or more networks 112, such as the Internet or any other network. Each of electronic communication channels 111a to 111n may be configured to exchange data using different (e.g., proprietary) protocols, data formats, metadata (and types thereof), etc. As shown, automated predictive response computing system 150 may be configured to receive electronic messages 114 via omnichannel electronic communication channel 113, whereby any of messages 114 may originate any of the different electronic communication channels 111a to 111n.

In the example shown, automated predictive response computing system 150 may be configured to include an omnichannel transceiver 151, a feature extraction controller 156, a predictive intent controller 154, a linguistic language translator 159, an automated voice-text response engine 171, and a universal data management engine 190. Omnichannel transceiver 151 may be configured to receive electronic messages 114 from any disparate electronic communication channels 111a to 111n and data formats to convert data representing electronic messages 114 into data formats with which automated predictive response computing system 150 may analyze and generate automated responses thereto. Hence, omnichannel transceiver 151 may be configured to detect data representing one or more electronic messages 114 configured to generate a response associated with an electronic communication channel of any electronic communication channels 111a to 111n, any of which may be associated with multiple data sources (e.g., computing platforms including processors and memory configured to provide communicative functionalities).

Omnichannel transceiver 151 may be configured to include logic to implement any number of application programming interface ("APIs") 151a and a channel converter 152. In some examples, which are non-limiting, omnichannel transceiver 151 may be configured to implement one or more APIs to exchange data with any of electronic communication channels 111a to 111n. As an example, APIs 151a may include an API configured to communicate electronically with Facebook® Messenger and the like, as well as any API configured to exchange voice data, text data, image data, or any other type of data. Channel converter 152 may be configured to detect a data format in which data of electronic message 114 is being conveyed, and may be further configured to convert a detected data format into a uniform or agnostic data format, such as a text data format or as graph-based data arrangement. As an example, image recognition software may be configured to detect an image and characterize its data elements, including an "intent" and associated "entity attributes." As another example, channel converter 152 may be configured to detect and identify (e.g., via tagged data, computational derivation, etc.) that data associated with electronic message 114 include text-based data, including supplemental data (e.g., metadata) as available. In yet another example, channel converter 152 may be configured to detect voice data to convert to text data, and further configured to detect text data to convert to voice data. Further, omnichannel transceiver 151 may be configured to transmit messages 116 that conform with requirements of any of electronic communication channels 111a to 111n.

Feature extraction controller 156 may be configured to extract features from one or more portions of data of one or more electronic messages 114. In some examples, feature extraction controller 156 may be configured to identify and form data units, such as tokens, words, linguistic phrases, etc., using any predictive algorithm, including any machine learning algorithm, deep learning algorithm, and other natural language algorithmic function (e.g., natural language processing, or "NLP"), as well as any other predictive algorithm, probabilistic algorithm, and the like. In some examples, feature extraction controller 156 may be configured to generate data so that predictive intent controller 154 may identify from extracted data units an "intent" and/or "topic," as well as one or more "entity attributes" (e.g., parameters, metrics, etc.) with which to generate an automated response. In some examples, feature extraction controller 156 may be configured to extract feature data that may include units of text (e.g., words or tokens), units of image data (e.g., an amount of pixels, or matched image data), units of audio or voice data, and the like.

Predictive intent controller 154 may be configured to receive data including extracted feature data from feature extraction controller 156 and other data, including, but not limited to, supplemental data, metadata, and other ancillary data. Further, predictive intent controller 154 may be configured to predict (e.g., statistically, probabilistically, etc.) an "intent" of subject matter associated with data of electronic message 114. In some examples, "intent" associated with data of an electronic message may be referred to as a "trigger," and may be calculated to be a predicted topic of a subset (e.g., a step) of an electronic conversation between any of users 108a and 108b and automated predictive response computing system 150. For example, an electronic message 114 may include data stating or requesting "I want to travel now from Paris to Hong Kong. Are there any flights available?" In this example, predictive intent controller 154 may include logic configured to determine that a user is interested "TRAVEL" as an "intent." Further, predictive intent controller 154 may be configured to determine entity attributes describing a "time" of travel (e.g., "now"), a destination (e.g., "Hong Kong"), and a point of origination (e.g., "Paris"). As such, predictive intent controller 154 may be configured to identify one or more subsets of intent-related data and one or more subsets of data representing one or more entity attributes (e.g., parameters with which to respond to an intent of electronic message 114), as well as data representing a degree or level of sentiment (e.g., affinity), a language associated with voice data and text data, a characterization of a message including profanity, and any other attribute. In some examples, predictive intent controller 154 may be configured to predict, identify, and monitor a "context" during which an intent or topic of electronic message 114 may be received and analyzed relative to other messages as part of an exchange of data constituting conversational flow.

Linguistic language translator 159 may be configured to receive data from feature extraction controller 156 that indicates a type of linguistic language (e.g., a spoken language) that may be defined by region and/or dialect, in at least some examples. In some examples, linguistic language translator 159 may be configured to determine a language based on text, a verbal utterance, or any other data input. Further, linguistic language translator 159 may be configured to translate or modify languages of received data in messages 114 and responses in messages 116, whereby subsets of messages 114 and 116 may vary in languages. For example, a multilingual speaker as user 108a or 108b may inadvertently vacillate among a number of languages. In this case, linguistic language translator 159 may be configured to detect messages 114, regardless of voice data or text data, by a specific user 108a in different languages, and may be further configured to correspond in reply messages 116 in corresponding languages. In various examples, linguistic language translator 159 may be configured to adapt any of portions of communication 119a, 119b, 119c, 119d, 119m, and 119m to any language, which may be linguistic or otherwise.

Automated voice-text response engine 171 may include logic configured to enable user 172a to generate an omnichannel voice-text response flow 130 via a computing device 172b. An example of such logic is depicted as voice-text flow builder logic 173. Automated voice-text response engine 171 may be configured to generate a flow 130 of responses to inquiries or other inbound data from any of users 108a and 108b, regardless of type of channel 111a to 111n through which conversational data may be exchanged (e.g., as voice data, text data, image data, etc.). Further, automated voice-text response engine 171 may be configured to facilitate implementation of omnichannel voice-text response flow 130, which, in turn, may identify exchanges of data 120a that may be characterized as a portion of communication in a conversation that may be associated with characterized data exchange 120. In some examples, automated voice-text response engine 171 may include logic configured to access voice-related data from third-party electronic communication channels, such as Twilio® or other equivalent data services.

Voice-text flow builder logic 173 may be configured to receive user input from computing device 172 to execute instructions to implement automated voice-text response engine 171. As shown, voice-text flow builder logic 173 may be configured to generate one or more responses 133 to an inbound portion of communication 131, such as an inquiry, a request, or other action intended to achieve resolution, clarification, or information. In response to the user inputs at computing device 172b, voice-text flow builder logic 173 may be configured to apply analytic logic to communication portions 131 received from any computing devices 103 to generate a response 133. Omnichannel voice-text response flow 130 may be constructed as governed by voice-text flow builder logic 173 to generate any number of triggers or actions to capture inbound communication portions 131 and outbound communication portions 133, such as exchanges of data 120a to 120e, whereby omnichannel voice-text response flow 130 may be configured to automatically (or semi-automatically) resolve an issue, problem, or question communicated via communication devices 103. Note that voice-text flow builder logic 173 may be configured to invoke implementation of any pattern recognition or probabilistic data computational algorithm, such as, but not limited to, a natural language processing ("NLP") algorithm. Further, voice-text flow builder logic 173 may be configured to implement conditional branching (not shown) and any other flow portion, any of which may be trained (in some examples) to identify intent or topic of an inbound communication data portion 131 to apply a response 133 (e.g., an optimized response) in furtherance of resolving an issue. In some implementations, voice-text flow builder logic 173 may be configured to provide a response 133 as voice data or text data (or other data) generated automatically by automated voice-text response engine 171. Also, voice-text flow builder logic 173 may be configured to invoke access to an agent (e.g., as a hand-off action) to communicate data via omnichannel 113 with user 108a or any other user.

Further to diagram 100, automated predictive response computing system 150 or a universal data management engine 190, or both, may be configured to generate, analyze, implement, and store data related to exchanges of characterized data 120. Exchanges of data 120a may include a portion of inbound communication data 119a and a portion of outbound communication data 119b, any of which may be implemented relative to exchanges of data set forth in omnichannel voice-text response flow 130. Note that omnichannel voice-text response flow 130 need not generate a one-to-one correspondence between inbound communication data portions (e.g., communication data portions 119a, 119c, and 119m) and outbound communication data portions (e.g., communication data portions 119b, 119d, and 119n). As an example, consider that inbound communication data 119a may include either voice data or text data as follows: "Hi, I bought a Galaxy 520 at Best Buy 2 months ago. Starting last week the battery drains. I get about 2 hours then it's dead." In response, automated predictive response computing system 150 or universal data management engine 190, or both, may be configured to automatically (or with agent assistance) respond as follows: "Hi Catherine, sorry to hear you have an issue with your phone." Other exchanges of communication data portions 119c to 119n may automatically address issues based on a portion of communication data (e.g., an "utterance" verbally or in text that may be segmented), whereby an agent may be involved (optionally) to resolve an issue.

Universal data management engine 190 may be configured to analyze each portion of communication data 119a to 119n to identify intent of a conversation, or a topic thereof, as well as a degree of sentiment (or affinity), entity attributes (e.g., parameters, etc.), and any other data or metadata that may characterize or describe any portion of communication data 119a to 119n. Further to diagram 100, universal data management engine 190 may be configured to analyze each portion of communication data 119a to 119n, and access other equivalent data in a universal dataspace (e.g., a universal data fabric) to characterize and augment each of portions of communication data 119a to 119n with associations to data 121a to 121n, respectively. In some examples, data 121a to 121n may represent metadata or any other data derived at automated predictive response computer system 150 or supplemented as profile data associated with a particular user, such as one of users 108a or 108b.

In view of the foregoing, structures and/or functionalities depicted in FIG. 1 as well as other figures herein, may be implemented as software, applications, executable code, application programming interfaces ("APIs"), processors, hardware, firmware, circuitry, or any combination thereof. In at least one example, automated predictive response computing system 150 may be implemented as a chatbot application. Note that elements depicted in diagram 100 of FIG. 1 may include structures and/or functions as similarly-named or similarly-numbered elements depicted in other drawings.

Figure 2:
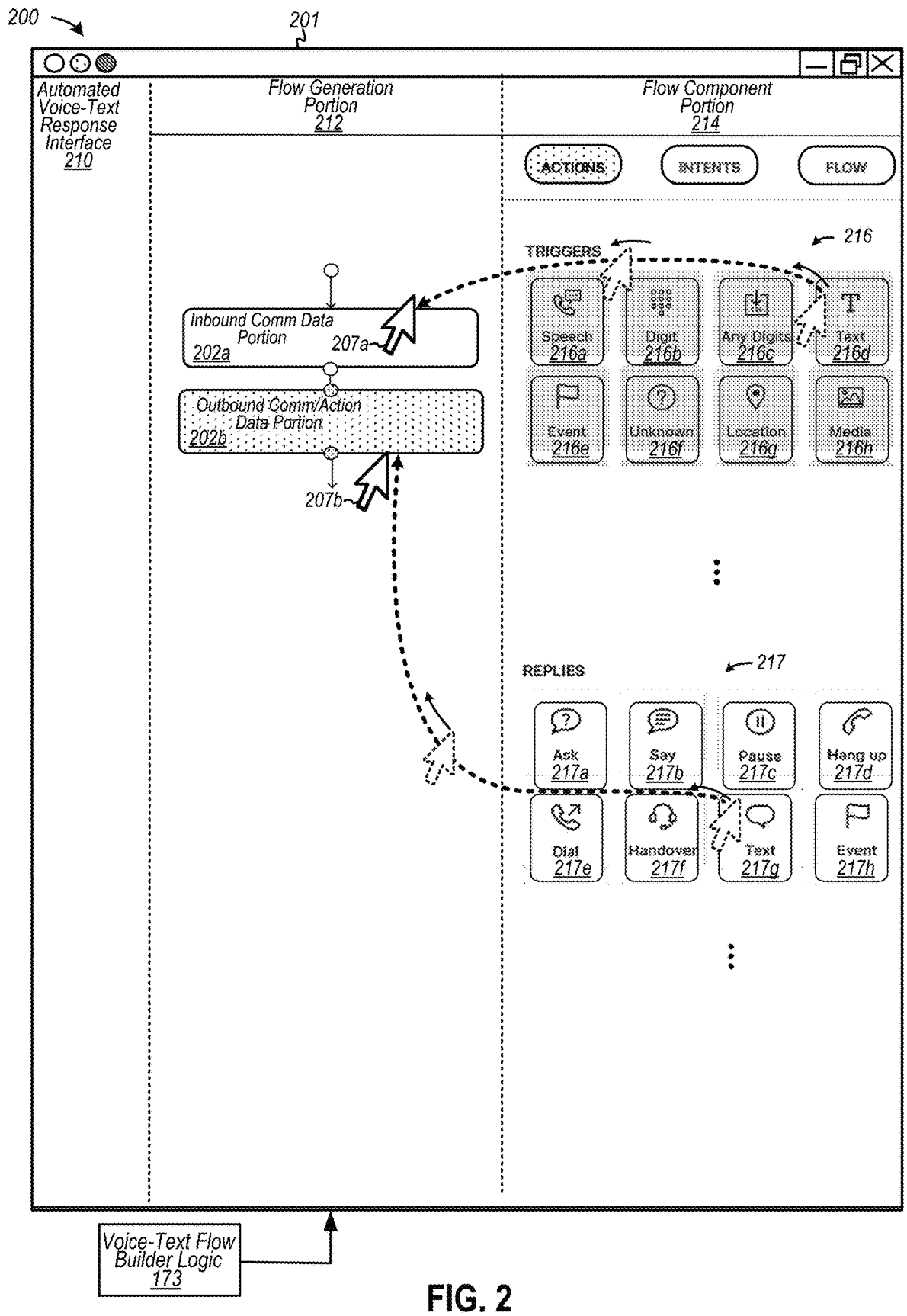
FIG. 2 depicts an example of a computerized tool configured to generate a flow to automatically respond to inbound data, according to some examples.

FIG. 2 depicts an example of a computerized tool configured to generate a flow to automatically respond to inbound data, according to some examples. Diagram 200 depicts a user interface 201 that is configured as a computerized tool to accept user inputs to generate a flow, such as a computerized conversational flow, that may be configured to identify and apply automated responses, whereby a response may be applied automatically as a function of one or more data conversational flows as well as data linked to other datasets derived from other applications. For example, data representing a response that is implemented within user interface 201 may be derived from data generated, derived, or identified by a universal data management engine, such as described herein, for example.

Diagram 200 depicts a user interface as a computerized tool 201 configured to present an automated voice-text response interface 210 that includes a flow generation portion 212 and a flow component portion 214. Voice-text flow builder logic 173 may be configured to generate computerized tool 201 as an interface to accept into flow generation portion 212 data representing an inbound communication data portion 202a as a function of a selected triggering event 216. Further, flow generation portion 212 may be configured, in response to executable instructions, to accept data representing an outbound communication data portion 202b as a function of a selected reply event 217.

In the example shown, trigger-related user inputs 216 may include "speech" user input 216a configured to activate upon detecting an inbound call (and voice data) interjecting a particular word or sentence, a "digit" user input 216b configured to activate upon detecting a user pressing a digit (e.g., a digit as identified as a, for example, as DTMF digit), an "any digit" user input 216c configured to activate upon detecting a sequence of digits pressed or transmitted, a "text" user input 216d configured to activate upon detecting an incoming voice call data or text data, an "event" user input 216e configured to activate upon detecting a certain event as a trigger, an "unknown user input 216f configured to activate upon detecting an input that an automated algorithm or "bot" may require additional data, a "location" user input 216g configured to activate upon detecting a location associated with inbound communication data (e.g., a geographic location, such as expressed as GPS coordinates), and a "media" user input 216h configured to activate upon detecting inbound data representing an image or other data, among other user inputs.

Also shown, reply-related user inputs 217 may include an "ask" user input 217a configured to activate a request for feedback, a "say" user input 217b configured to transmit a voice-based response, a "pause" user input 217c configured to provide a timing-related delay prior to a response, a "hang-up" user input 217d configured to activate an action to close or shut down an electronic channel carrying voice data (e.g., a voice telephone call), a "dial" user input 217e configured to forward a voice call to another phone number or other data recipient, a "handover" user input 217f configured to transfer a voice or text data stream to another recipient, a "text" user input 217g configured to activate upon detecting an action to respond either with voice data or text data, an "event" user input 217h configured to activate upon detecting an event, among other user inputs.

As shown, voice-text flow builder logic 173 of diagram 200 may be configured to accept a user input, such as input 207a, to perform a drag-and-drop operation to insert and generate a flow in flow generation portion 212 that may be configured to receive either voice data or text data, or both, as an inbound portion of communication data. Further, voice-text flow builder logic 173 may be configured to accept a user input, such as input 207b, to perform a drag-and-drop operation to insert and generate a response in a flow in flow generation portion 212 that may be configured to provide response data as either voice data or text data, or both, as an outbound portion of communication data.

In view of the foregoing, user inputs 207a and user inputs 207b may be configured to generate a conversational flow based on automated responses and manual responses, whereby automatic responses may be based on data representing a conversational data exchange, data representing a profile (e.g., user data), data representing cohorts or other related persons (e.g., equivalent persons or demographic data), and any other associated data with which to provide a response to resolve any issue. Further, voice-text flow builder logic 173 may be configured to an interactive voice response ("IVR") application that is modified to perform specialized functionalities as described herein.

Figure 3:
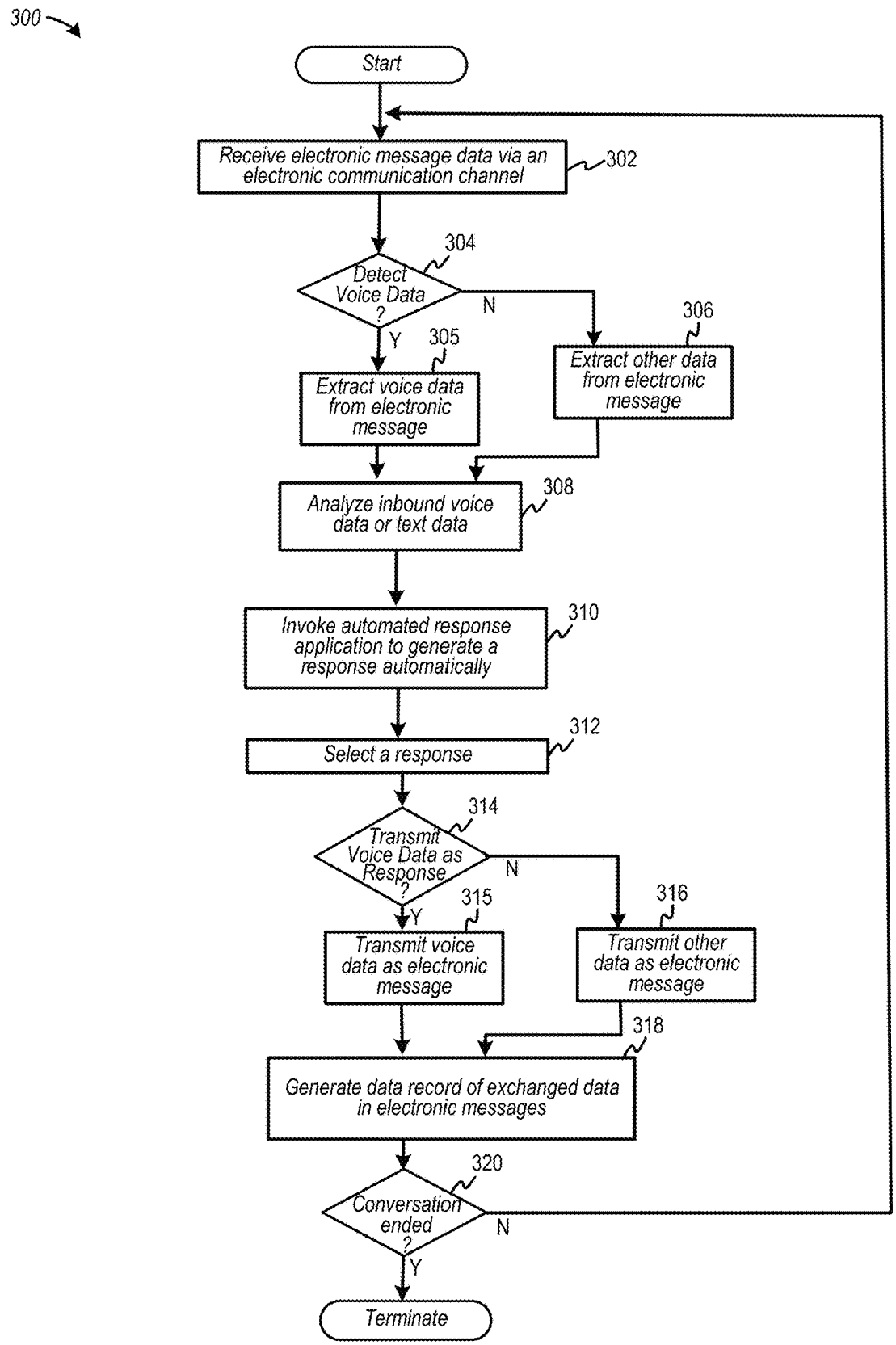
FIG. 3 is a diagram depicting an example of a flow to resolve issues arising in exchange of conversational data that may include voice data and text data, according to some examples.

FIG. 3 is a diagram depicting an example of a flow to resolve issues arising in exchange of conversational data that may include voice data and text data, according to some examples. Flow 300 initiates at 302, at which electronic message data may be received via any electronic communication channel. In some examples, electronic message data may be received and transmitted over any communication channel implementing an omnichannel transceiver or any other electronic device. At 304, a determination is made as to whether voice data is detected. If not, flow 300 continues to 306 at which other data from an electronic message may be extracted, such as text data, image data, or any other data. But if voice data is detected at 306, flow 300 may be configured to transition to 305 at which voice data may be extracted from an electronic message. In some examples, voice data extracted at 305 may constitute an utterance or a portion of communication data, according to some examples.

At 308, inbound data may be analyzed to detect whether inbound data includes voice data, text data, or other data. For example, inbound data may be further analyzed to characterize or classify any portion of inbound portions of communication data to correlate data associated with an application (e.g., a community care application) to other data associated with other applications (e.g., a marketing application, an on-line community application, or any other application and corresponding dataset).

At 310, an automated response application may be invoked to generate a response automatically to inbound portions of communication data by analyzing contents and data of the inbound portions of communication data. Based on data representing the contents of one or more inbound portions of communication data, one or more responses may be selected at 312. At least one response may be an automatic response (e.g., implementing a "chat bot") as a function of the contents of an inbound portion of communication data and other relevant data, including derived data determined by analyzing multiple exchanges of data and other datasets derived from other applications, such as online community and marketing data functions.

At 314, a determination is made as to whether voice data may be transmitted as part of an automatic response. If not, flow 300 continues to 316 at which data other than voice-based data may be transmitted as an electronic message. But if voice data (e.g., automated voice data) ought to be transmitted at 315, flow 300 may be configured to transition to 315 at which voice data including a response may be transmitted as a portion of an electronic message. At 318, a data record or transcript of exchanged data messages including voice data and text data (or any other type of data) may be generated and stored for further analysis. Note that a data record may also include actions taken (e.g., automatically) or omitted as well as any other type of data that may be ancillary to an exchange of data. In some examples, a data record or transcript of exchanged data messages may be converted to text (e.g., if a data exchange includes voice data) to analyze to determine predictive responses as well as to generate auto-summaries for further analysis and review (e.g., by an agent supervisor or IT/software developer, or the like). At 320, a determination made as to whether an exchange of data and a conversation has ended. If not, flow 300 continues back to 302.

Figure 4:
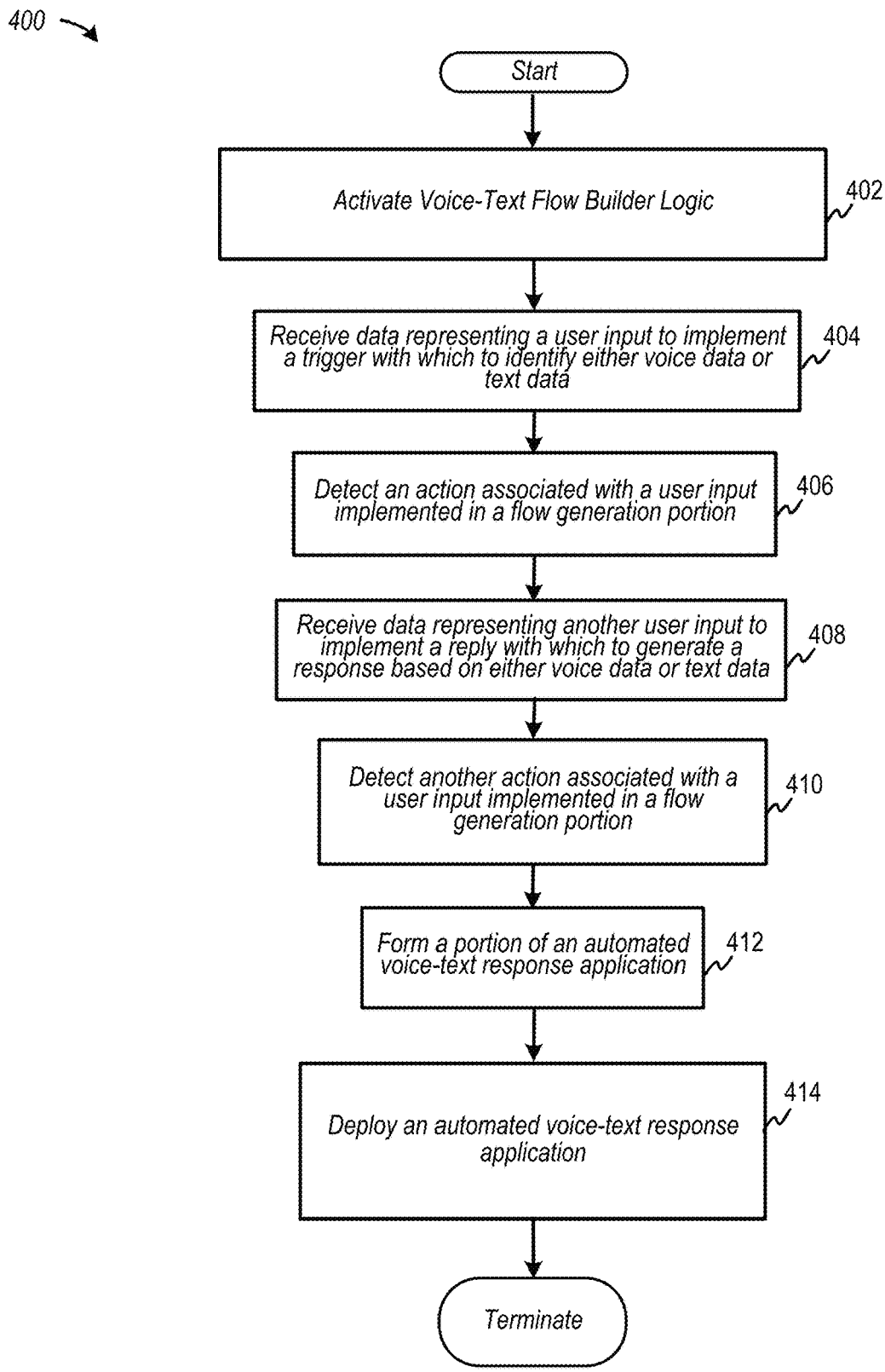
FIG. 4 is a diagram depicting an example of a flow to construct a digital conversational flow, according to some examples.

FIG. 4 is a diagram depicting an example of a flow to construct a digital conversational flow, according to some examples. At 402, flow 400 is initiated to activate voice-text flow builder logic, as described herein. At 404, data representing a user input to implement a trigger may be received. The user input may be configured to identify whether to identify inbound communication data portions as being voice-related text-related, or both. In some examples, the user input may be formed as part of a user interface that may be implemented as a computerized tool described herein. At 406, an action associated with a user input may be detected to implement a flow generation portion. For example, a user input may be detected as being implemented as a "drag-and-drop" functionality.

At 408, data representing another user input may be configured to implement a reply with which to generate a response based on either voice or text data. At 410, another action may be detected in association with a user interface configured to implement voice-text flow builder logic to implement a response. In some examples, a response determined at 410 may be generated based on data derived or otherwise linked to other data sources (e.g., other enterprise applications, such as community care applications, marketing-related applications, on-line community applications, customer experience ("CX") insight applications, and the like). At 412, a portion of an automated voice-text response application may be formed, created, or generated. At 414, an automated the voice-text response application may be deployed, either locally or distributed across any number of networks.

Figure 5:
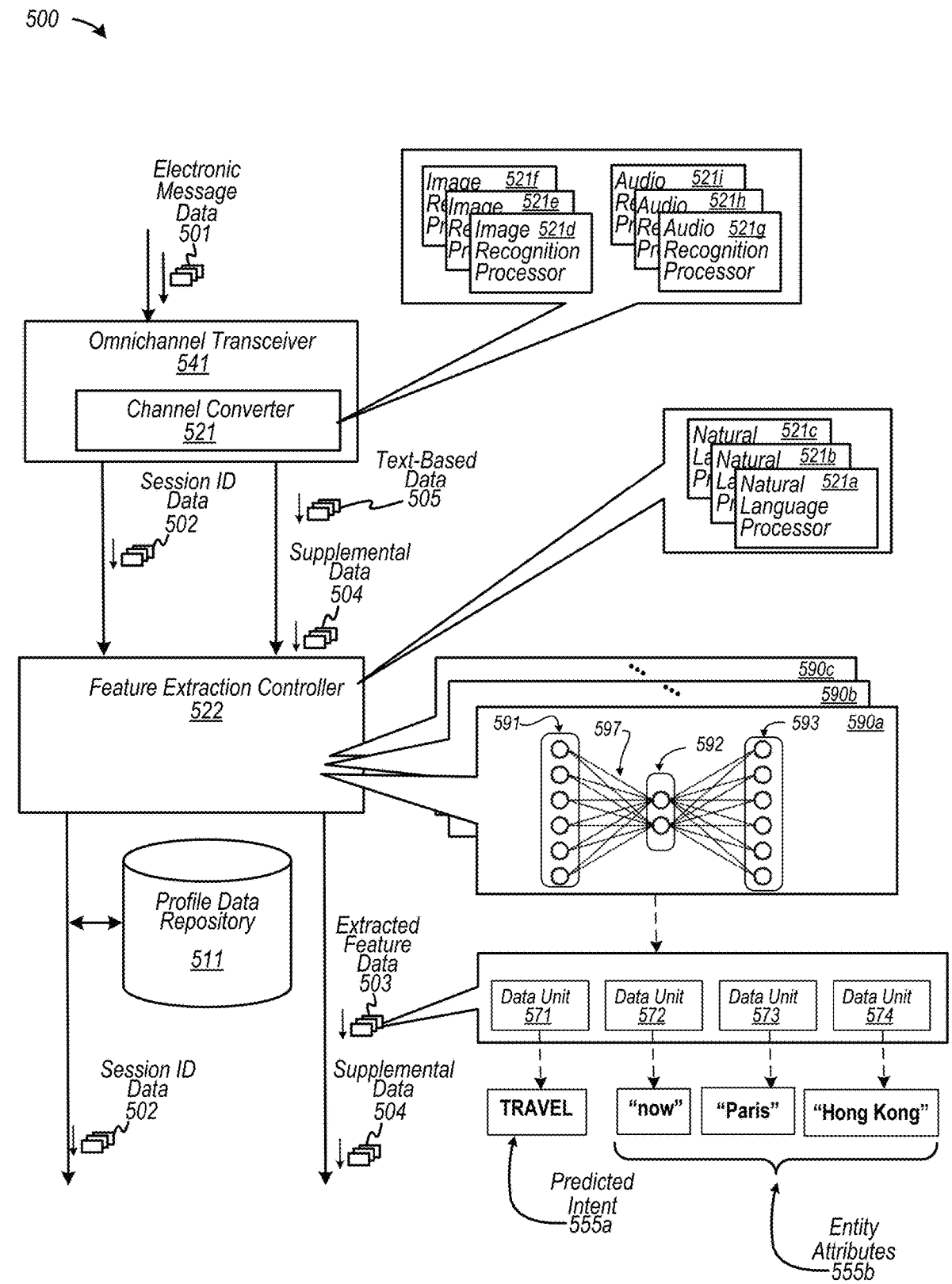
FIG. 5 depicts an example of a subset of functional elements of an automated predictive response computing system, according to some examples.

FIG. 5 depicts an example of a subset of functional elements of an automated predictive response computing system, according to some examples. Diagram 200 includes an omnichannel transceiver 541, which is shown to include a channel converter 521, and a feature extraction controller 522. Note that elements depicted in diagram 500 of FIG. 5 may include structures and/or functions as similarly-named or similarly-numbered elements depicted in other drawings.

In some examples, omnichannel transceiver 541 may be configured to receive electronic message data 501 from any electronic communication channel, and may further configured to generate or transmit session identifier ("ID") data 502, text-based data 505, and supplemental data 504. Session ID data 502, which may be optional, may include data referring to an originating communication device 103 of FIG. 1 (e.g., an IP or MAC address, etc.) or any other identifying information associated with a particular user 108a. Session ID data 502 may be used to monitor exchanges of data constituting conversation data for establishing a "context" with which to enhance accuracy of generating automated responses to electronic message data 501. Session ID data 502 may be implemented to identify profile data of a particular user or computing device, where profile data may be stored in a profile data repository 511. Examples of profile data are depicted or described herein. For example, profile data associated with session ID data 502 may include a name of a user (e.g., a customer) and customer contact information, such as an email, a residential address, a telephone number, etc. Further, profile data may include data representing past interactions with automated bots and/or agents, data representing any number of social networks with which a customer is affiliated, data representing a loyalty member number, and any other data, such as past product purchases, searches for products, inquiries, and the like.

In some examples, omnichannel transceiver 541 may be configured to identify and transmit supplemental data 504, which may include any metadata that be identified (e.g., in association with a particular electronic communication channel). For example, supplemental data 504 may include metadata specifying a particular language (and/or geographic region) that a particular user desires to communicate linguistically.

Channel converter 521 and feature extraction controller 522 may include any number of feature extraction processes to, for example, extract feature data to analyze electron message data 501 and supplemental data. Channel converter 521 and feature extraction controller 522 may be further configured to generate a number of feature vectors to perform pattern recognition, predictive or probabilistic data analysis, machine learning, deep learning, or any other algorithm (e.g., heuristic-based algorithms) to identify at least a subset of features that may constitute an event (as derived from data from various data sources).

Channel converter 521 may include any number of image recognition processor algorithms 521d to 521f, any number of audio recognition processor algorithms 521g to 521i, or any other set of algorithms. Image recognition processor algorithms 521d to 521f may be configured to perform character recognition (e.g., optical character recognition, or "OCR"), facial recognition, or implement any computer vision-related operation to determine image-related features, which may be interpreted into text-based data 505. Audio recognition processor algorithms 521g to 521i may be configured to perform voice and speech recognition, sound recognition, or implement any audio-related operation to determine audio-related features, which may be converted into text-based data 505.

Feature extraction controller 522 may include any number of natural language processor algorithms 521a to 521c that may be configured, for example, to tokenize sentences and words, perform word stemming, filter out stop or irrelevant words, or implement any other natural language processing operation to determine text-related features. In some examples, feature extraction controller 522 may include any number of predictive data modeling algorithms 590a to 590c that may be configured to perform pattern recognition and probabilistic data computations. For example, predictive data modeling algorithms 590a to 590c may apply "k-means clustering," or any other clustering data identification techniques to form clustered sets of data that may be analyzed to determine or learn optimal classifications of "intent" data and associated outputs and supplemental data related thereto, as well as "entity attribute" data. In some examples, feature extraction controller 522 maybe configured to detect patterns or classifications among datasets through the use of Bayesian networks, clustering analysis, as well as other known machine learning techniques or deep-learning techniques (e.g., including any known artificial intelligence techniques, or any of k-NN algorithms, linear support vector machine ("SVM") algorithm, regression and variants thereof (e.g., linear regression, non-linear regression, etc.), "Zero-shot" learning techniques and algorithms, Bayesian inferences and the like, including classification algorithms, such as Naïve Bayes classifiers, or any other statistical, empirical, or heuristic technique). In other examples, predictive data modeling algorithms 590a to 590c may include any algorithm configured to extract features and/or attributes based on classifying data or identifying patterns of data, as well as any other process to characterize subsets of data, regardless of whether supervised or unsupervised.

In the example shown, feature extraction controller 522 may be configured to implement any number of statistical analytic programs, machine-learning applications, deep-learning applications, and the like. Feature extraction controller 522 is shown to have access to any number of predictive models, such as predictive model 590a, 590b, and 590c, among others. As shown, predictive data model 590a may be configured to implement one of any type of neuronal networks to predict an action or disposition of an electronic message, or any output representing an extracted feature for determining either an event or supplemental data to determine compatibility, or both. A neural network model 590a includes a set of inputs 591 and any number of "hidden" or intermediate computational nodes 592, whereby one or more weights 597 may be implemented and adjusted (e.g., in response to training). Also shown is a set of predicted outputs 593, such as text terms defining a predicted "intent" 555a or "entity attributes" 555b (e.g., parameters, characteristics, etc.), among any other types of outputs.

Feature extraction controller 522 may include a neural network data model configured to predict (e.g., extract) contextual or related text terms based on generation of vectors (e.g., word vectors) with which to determine degrees of similarity (e.g., magnitudes of cosine similarity) to, for example, establish "contextual" compatibility, at least in some examples. Output data 593 as contextual or related text terms may be used to identify intent data (e.g., as an event or a trigger). In at least one example, feature extraction controller 522 may be configured to implement a "word2vec" natural language processing algorithm or any other natural language process that may or may not transform, for example, text data into numerical data (e.g., data representing a vector space). According to various other examples, feature extraction controller 522 may be configured to implement any natural language processing algorithm.

In view of the foregoing, channel converter 521 and feature extraction controller 522 may be configured to implement various feature extraction functions to extract features that can identify one or more groups of data units 571 to 574 as extracted feature data 503, whereby each group of data units 571 to 574 may be associated with an electronic message data 501. As an example, electronic message data 501 may include text data requesting "I need to book a flight now from Paris to Amsterdam." Further to this example, data unit 571 may represent extracted text term "TRAVEL" as a predicted "intent" data value 555a. Data unit 572 may represent extracted text term "now" as an entity attribute (or parameter) that describes timing of a "traveling" event. Data unit 573 may represent extracted text term "Paris," which may describe a point of embarkation and data unit 574 may represent extracted text term "Hong Kong" as a destination. Data units 572, 573, and 574 may be entity attributes 555b (or parameters, or as entities). Note further that extracted text term "TRAVEL" may be determined as a predicted "intent" data value 555a by feature extraction controller 522 or by predictive intent controller 654 of FIG. 6, or by both.

Figure 6:
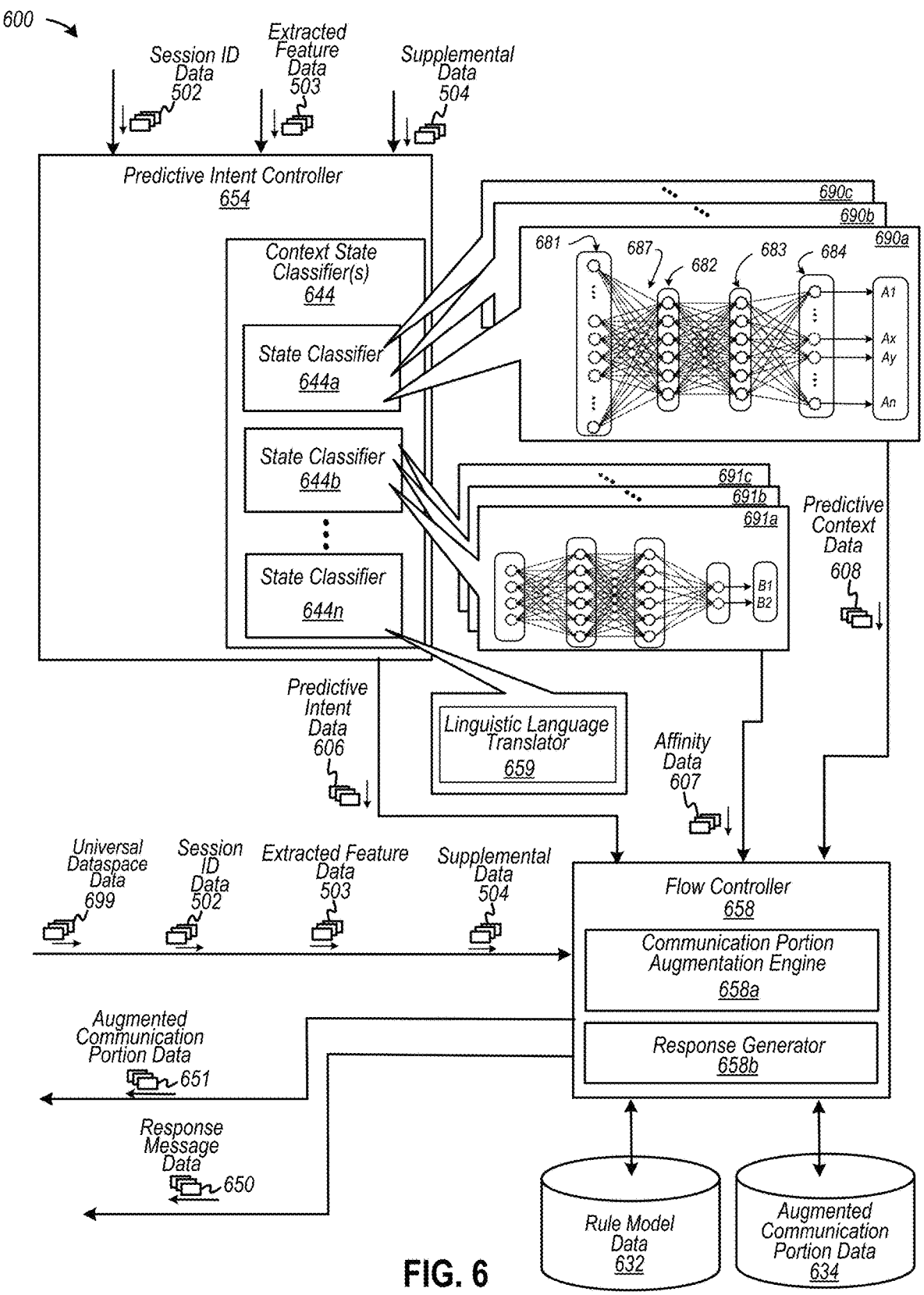
FIG. 6 depicts an example of another subset of functional elements of an automated predictive response computing system, according to some examples.

FIG. 6 depicts an example of another subset of functional elements of an automated predictive response computing system, according to some examples. Diagram 600 includes a predictive intent controller 654, which is shown to include a one or more context state classifiers 644, and a flow controller 658. Predictive intent controller 654 may be configured to receive one or more of session ID data 502, extracted feature data 503, and supplemental data 504 of FIG. 5. In some examples, predictive intent controller 654 may be configured to determine (or confirm) that one or more extracted data units (e.g., one or more extracted text terms) specify a topic of electronic conversation, or an intent of an electronic message. Predictive intent controller 654 may generate predictive intent data 606 specifying an "intent" of an electronic message. Note that elements depicted in diagram 600 of FIG. 6 may include structures and/or functions as similarly-named or similarly-numbered elements depicted in other drawings.

In some examples, state classifiers 644a and 644b may be configured to implement any number of statistical analytic programs, machine-learning applications, deep-learning applications, and the like. State classifier 644a may include any number of predictive models, such as predictive models 690a, 690b, and 690c, and state classifier 644b may include one or more predictive models, such as predictive models 691a, 691b, and 691c. Predictive models 690 and 691 may be implemented similar to, or equivalent to, predictive models described in FIG. 5.

In one example, predictive intent controller 654 and/or state classifier 644a may receive inputs of any combination of session ID data 502, extracted feature data 503, and supplemental data 504 to compute predictive context data 608. For example, inputs to state classifier 644a may generate predictive context data 608 to indicate a predicted state of a flow of conversational data to provide context to determine an optimal reply or response. According to some examples, predictive context data 608 may include data describing an intent, a topic, a summary of a group of text (including text data converted from voice data), or any other data. In some examples, predictive logic (e.g., a neural network model may include a set of inputs 681 and any number of "hidden" or intermediate computational nodes 682 and 683, whereby one or more weights 687 may be implemented and adjusted (e.g., in response to training) to provide output data at 684.

As another example, inputs into state classifier 644b may determine affinity data 607 that may indicate sentiment state data, such as whether a distributed data file may be associated with a positive affinity state, a neutral affinity state, or a negative affinity state (or any degree or level of positive or negative affinity or sentiment). In accordance with at least some examples, affinity data 607 (e.g., sentiment state data or other like data) may include a range of data values that can include data values ranging from a maximal value of a positive affinity state to a maximal negative affinity state, the range including at least a subset of one or more data values representing a neutral affinity state. Thus, affinity data 607 may include a range of affinity (e.g., sentiment values).

Other state classifiers, such as state classifier 644n, may generate other electronic message state data characterizing an electronic message to determine a voice-text response flow with which to respond. As shown, one example of a state classifier 644n may be configured to implement a linguistic language translator 659 to determine a language associated with an exchange of data. In yet another example, state classifier 644n may be configured to classify voice and text data as being inappropriate or profane to, for example, exclude or mask such language from public display.

In the example shown, flow controller 658 may include a communication portion augmentation engine 658a and a response generator 658b. Further, flow controller 658 may be configured to analyze data representing an "intent" (e.g., a predicted topic or intended result of an electronic message), one or more entity attributes (e.g., data representing one or more entities), context data, etc., to calculate an optimal response. Flow controller 658 may be configured to receive predictive intent data 606 and other data from predictive intent controller 654, including affinity data 607 and predictive context data 608, as well as session ID data 502, extracted feature data 503, and supplemental data 504, both as described relative to FIG. 5. Referring back to FIG. 6, flow controller 658 may also be configured to receive universal dataspace data 699 that may include data or derived data that may originate over multiple datasets each associated with a specific application (e.g., a marketing application, an on-line community application, a customer care application, and the like). Universal dataspace data 699 may be used to provide an optimized response via response message data 650, as generated by response generator 658b.

As example, an optimized response in response message data 650 may be determined or originate in a popular or validated posting to an on-line community that resolves a specific issue, based on a community of users having specialized knowledge. As another example, an optimized response in response message data 650 may include a workflow, such as a step-by-step guided trouble-shooting flow to present to either a customer user or an agent user, whereby the workflow may be selected by response generator 658b as a function of one or more of predictive intent data 606, affinity data 607, predictive context data 608, session ID data 502, and extracted feature data 503, as well as other data described herein. Examples of universal dataspace data 699 may be described in FIGS. 7 and 8 herein, as well as in relation to any other figure.

Communication portion augmentation engine 658a may include logic (e.g., hardware or software, or any combination thereof) configured to associate (e.g., "tag") portions of communication data, such as an "utterance," with contextual data for further analysis and optimization of either automatic responses (e.g., via specialized bots) or responses provided by agents, or any hybrid or combination of a blended flow including automatic responses and responses by agents via voice data or text data (or other data). Further, communication portion augmentation engine 658a may be configured to tag various types of data to augment one or more of a unit of conversation, a portion of communication data, and/or data representing an utterance. In some examples, data associated with a portion of conversation data may represent metadata or any other data derived at an automated predictive response computer system or supplemented as profile data associated with a particular user or group of users.

Flow controller 658 may be coupled electronically to a rule model data repository 632 and an augmented communication portion data repository 634. In some examples, data representing rule model data 632 may be configured to provide one or more rules with which to select and route responses to adaptively and flexibly provide replies and responses to corresponding incoming electronic messages. Augmented communication portion data repository 634, according to some examples, may be configured to store and manages one or more of predictive intent data 606, affinity data 607, predictive context data 608, session ID data 502, and extracted feature data 503, as well as other data described herein, such as profile data. Data stored in augmented communication portion data repository 634 may be accessible to facilitate analysis with which to determine optimized responses based on aforementioned types of data.

Response generator 658b may be configured to generate response message data 650 based on a selected omnichannel voice-text response flow. Response message data 650 may include one or more of a response message, an action to be performed, a "hand-off" to an agent, a deflected voice call to text message, or any other action. Hence, flow controller 658 may be further configured to control a flow of an electronic conversation by, for example, identifying successive "intents" associated with successive incoming electronic messages, and by routing a flow of an electronic conversation based on predicted intents and responses, regardless of communication data channel (e.g., either voice or text) and whether an automated response or an agent-generated response is provided.

In view of the foregoing, structures and/or functionalities depicted in FIGS. 5 and 6 as well as other figures herein, may be implemented as software, applications, executable code, application programming interfaces ("APIs"), processors, hardware, firmware, circuitry, or any combination thereof, any of which may constitute at least a portion of data fabric.

Figure 7:
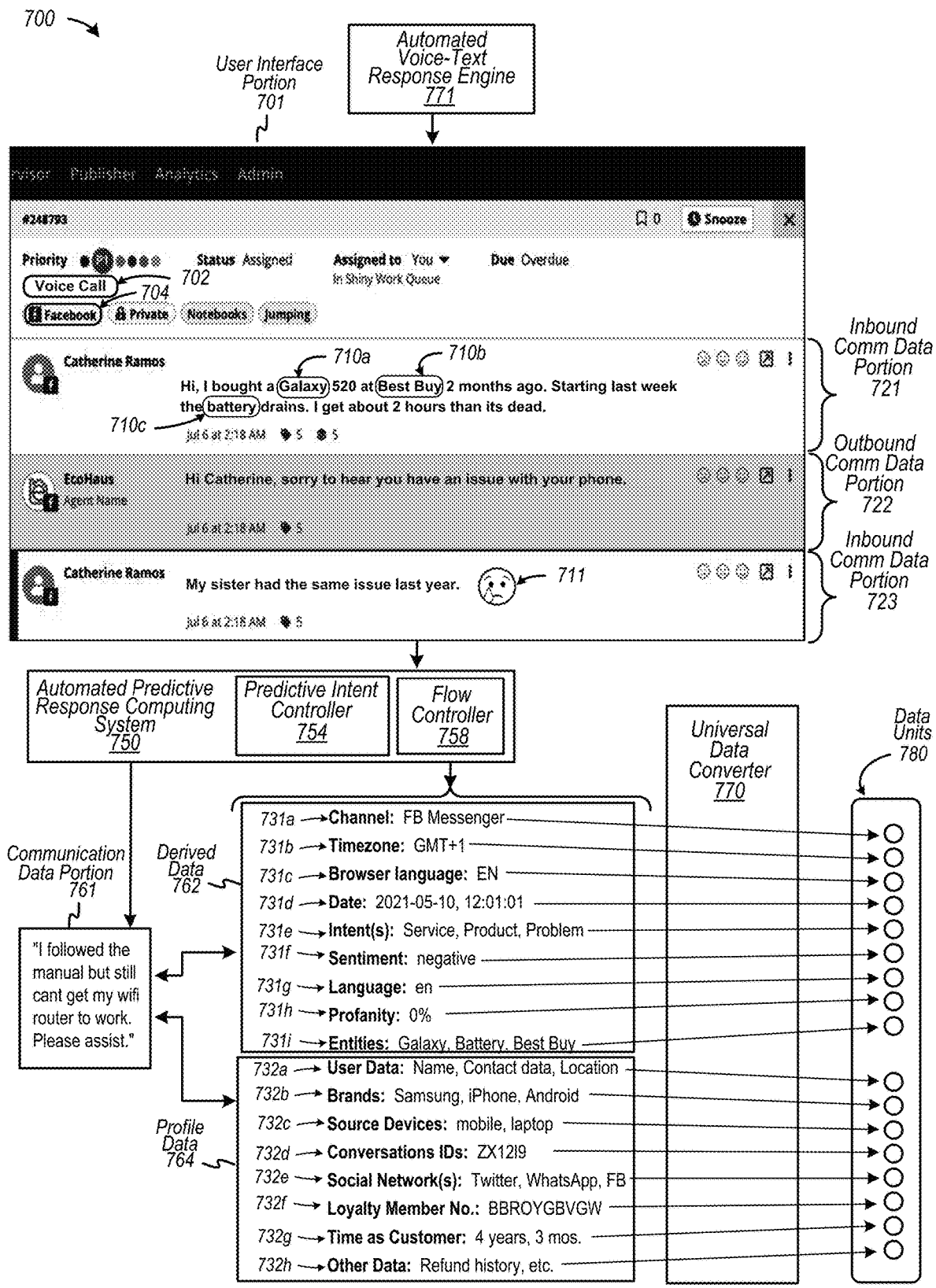
FIG. 7 depicts an example of an automated predictive response computing system configured to augment portions of communication data, according to some examples.

FIG. 7 depicts an example of an automated predictive response computing system configured to augment portions of communication data, according to some examples. Diagram 700 includes an automated predictive response computing system 750, which may include a predictive intent controller 754 and a flow controller 758 configured to associated (e.g., tag) a communication data portion 761 with augmented data (e.g., a metadata). Hence, communication data portion 761 may be referred to as an augmented communication data portion 761. Further, diagram 700 includes an automated voice-text response engine 771 configured to facilitate exchanges of communication data portions via a user interface 701. Note that elements depicted in diagram 700 of FIG. 7 may include structures and/or functions as similarly-named or similarly-numbered elements depicted in other drawings or described herein.

Automated voice-text response engine 771 may be configured to facilitate exchanges of inbound and outbound communication ("comm") data portions 721, 722, and 723, among others, whereby one or more of inbound and outbound communication data portions 721, 722, and 723 may be communicated as voice data (e.g., indicated as a voice call 702) or as text data (e.g., indicated as text-based electronic message communicated via messenger data channel 704). Any of outbound communication data portions 722 may be derived as responses (e.g., optimize responses) is described herein, and may be automatically generated (e.g., as a "bot" implementing predictive data analysis such as provided by predictive intent controller 754 and flow controller 758. In at least one example, automated voice-text response engine 771 may be included as a portion of a "customer care" application configured to exchange communication data with any number of customers to resolve an issue and to provide information.

In the example shown, inbound communication data portions 721 and 723 may be received and analyzed at automated predictive response computing system 750 to detect entities or entity attributes 710a ("Galaxy" phone), 710b ("Best Buy" retailer), and 710c ("battery"), as well as an image 711 (e.g., a crying, sad emoji) that may be analyzed to determine a degree of sentiment (e.g., a negative sentiment associated with an exchange of communication data portions).

Automated predictive response computing system 750 may be configured to associate or otherwise "tag" one or more communication data portions 721, 722, and 723 with data representing augmenting data (e.g., metadata), such as derived data 762 (e.g., as derived by automated predictive response computing system 750) and profile data 764. Derived data 762 may include data representing a channel 731a (e.g., Facebook messenger, or FB messenger), a time zone 731b (e.g., GMT+1), a browser language 731c (e.g., EN, or English), a date and time 731d (e.g., 2021-05-10, 12:01:01), one or more identified "intents" or topics 731e (e.g., "Service," "Product," "Problem"), a degree of sentiment 731f (e.g., negative), one or more linguistic languages 731g (e.g., EN, or English) in which communication data portions are exchanged, a degree of profanity detected 731h (e.g., 0%), one or more entities or entity attributes 731i (e.g., "Galaxy," "battery," "Best Buy"), among other data representing derived data 762. Profile data 764 may include data representing user data 732a (e.g., a name, contact data, location, etc., associated with the user or customer), brand-related data 732b (e.g., "Samsung," "iPhone," "Android," etc.), source electronic communication devices 732c (e.g., mobile phone, laptop, tablet, etc.), one or more conversation identifiers, or IDs, 732d (e.g., ZX1219, YY1238, etc.), one or more social networks associated with a user 732e (e.g., Twitter, WhatsApp, Facebook, etc.), a loyalty member number 732f (e.g., no. BBROYGBVGW), an amount of time during which a user is been a loyal customer 732g (e.g., 4 years and 3 months), and other data 732h (e.g., refund history, purchase history, interaction history, and any other data), among other data representing profile data 764.

Diagram 700 also depicts a universal data converter 770 that may be configured to convert derived data 762 and profile 764 into any data format with which to correlate or link to other subsets of data in datasets associated with other applications. As shown, each of data 731a to 731i and 732a to 732h may be converted into corresponding data unit 780, which may include nodes of a graph-based data arrangement. Note, however, that data arrangements described herein are not limited to graph-based data arrangements and may be implemented in any type of data arrangement (e.g., relational data base structures, structured data, unstructured data, etc.) As such, universal data converter 770 may be configured to facilitate normalization of data with which to associate across multiple data sources (e.g., multiple applications datasets of an enterprise) to identify related data to generate optimized responses, whether automatically generated or implemented by an agent.

Figure 8:
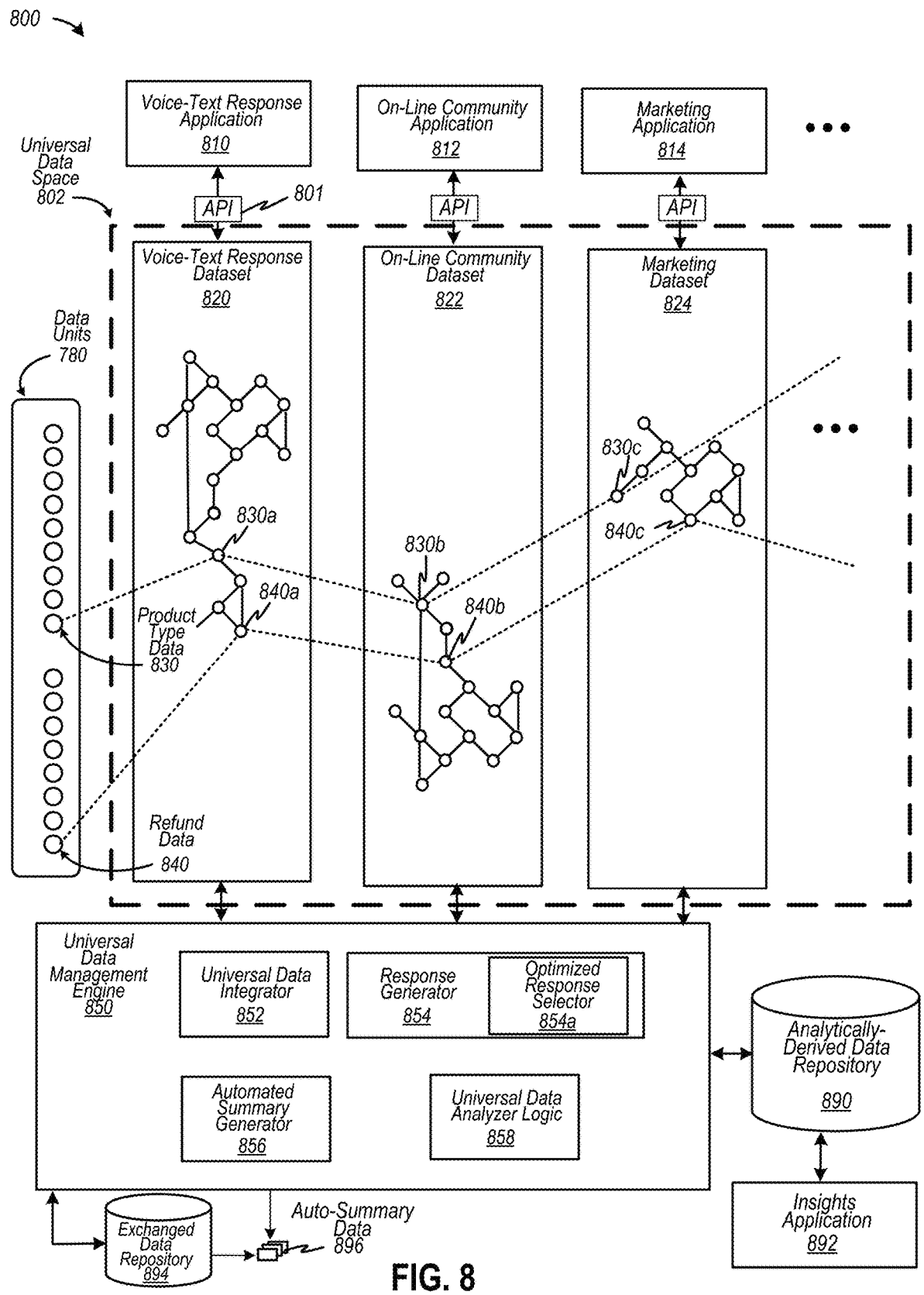
FIG. 8 depicts an example of a universal data management engine configured to correlate portions of communication data and other data generated in a universal dataspace, according to some examples.

FIG. 8 depicts an example of a universal data management engine configured to correlate portions of communication data and other data generated in a universal dataspace, according to some examples. Diagram 800 includes a universal data management engine 850, which may include a universal data integrator 852 configured to integrate data, such as data units 780 of FIG. 7 with other data within universal dataspace 802, a response generator 854 (e.g., including an optimized response selector 854*a*) configured to generate a response (e.g., an optimized response) a function of data analyzed within universal dataspace 802, an automated summary generator 856 to generate a cogent summary of an exchange of data between one or more users or customers, and universal data analyzer logic 858 configured to implement various predictive algorithms, such as described herein (e.g., machine learning, deep learning, etc.) to discover patterns and insights among data in universal dataspace 802 that may relate to data units 780 of FIG. 7.

Referring back to FIG. 8, universal data management engine 850 may electronically communicate with an exchange data repository 894 that may include an archive of exchanged communication data portions and conversations (e.g., voice-based data, text-based data, image-based data, etc.). Further, universal data management engine 850 may also electronically communicate with an analytically-derived data repository 890, which may include analytic data and insight-related data derived by universal data analyzer logic 858. As such, logic implementing an insights application 892 may be configured to provide analytic insights into any portion of data in universal dataspace 802. In one example, insights application 892 may include logic configured to provide "customer experience" or "CX" analytic data. Note that elements depicted in diagram 800 of FIG. 8 may include structures and/or functions as similarly-named or similarly-numbered elements depicted in other drawings or described herein.

Universal data integrator 852 may be configured to integrate data among any number of datasets, such as voice-text response dataset 820, on-line community dataset 822, marketing dataset 824, and any other dataset, to form a universal dataspace 802, which may represent a portion of a data fabric, at least in some examples. As shown, a voice-text response application 810 (e.g., a "customer care" application) may be configured to generate data associated with customer engagement and issue resolution in dataset 820, an on-line community application 812 may be configured to provide digital spaces where customers can provide or receive answers, connect with peers or other similarly-situated users, and share new ideas, whereby community-related data may be stored as dataset 822, and a marketing application may be configured to implement social media and engagement tools to generate marketing-related data in dataset 824. Note that data associated with universal dataspace 802 may be distributed among any number of data storages, such as various cloud storage devices or any number of on-location storage devices, and may be electronically coupled via any number APIs 801 to any number of data sources (e.g., including data-creation sources).

In the example shown, universal data integrator 852 may be configured to identify equivalent or similar data, and to generate links or association with correlated data over any number of datasets 820, 822, and 824. For example, universal data integrator 852 may be configured to identify equivalent or similar product type data 830 of data units 780 in dataset 820 (e.g., graph node 830*a* or any other data format), as well as in dataset 822 (e.g., node 830*b*), and node 830*c* of dataset 824. Further, universal data integrator 852 may be configured to identify equivalent or similar refund type data 840 of data units 780 in dataset 820 (e.g., graph node 840*a* or any other data format), as well as in dataset 822 (e.g., node 840*b*), and node 840*c* of dataset 824.

Further to the example above, universal data analyzer logic 858 may be configured to analyze product type data 830 and refund type data 840 over an entire universal dataspace 802 to identify, for example, extraordinary amount of refunds related to a particular product type. For example, an unusual number of refund requires for a certain product (e.g., in a particular geographic location) may suggest defective shipment or lot number of the product. Insights application 892 may be configured to identify such an anomaly and facilitate expeditious resolution than otherwise may be the case. Further, such an anomaly or issue with a particular product type may be identified by response generator 854, which, in turn, may be configured to enable optimized response selector 854*a* to communicate automatically to customers (e.g., via specialized automated bots or through agent assistance) an up-to-date response to resolve predicted issues based on data analyzed in universal dataspace 802, which may represent data associated with multiple data applications of an enterprise. In some examples, optimizer response selector 854*a* may be configured to present a "next best action" to an agent to provide assistance via voice data or text data, and may also provide a "next best action" by way of an automated bot.

Automated summary generator 856 may be configured to access exchange data repository 894 to generate auto-summary data 896 to provide for data representing a synopsis or summary of exchanges between a customer and automated bots or an agent, as well as summaries of communication exchanges among a group of customers and automated bots or an agent.

In view of the foregoing, structures and/or functionalities depicted in FIG. 8, as well as other figures herein, may be implemented as software, applications, executable code, application programming interfaces ("APIs"), processors, hardware, firmware, circuitry, or any combination thereof.

Figure 9:
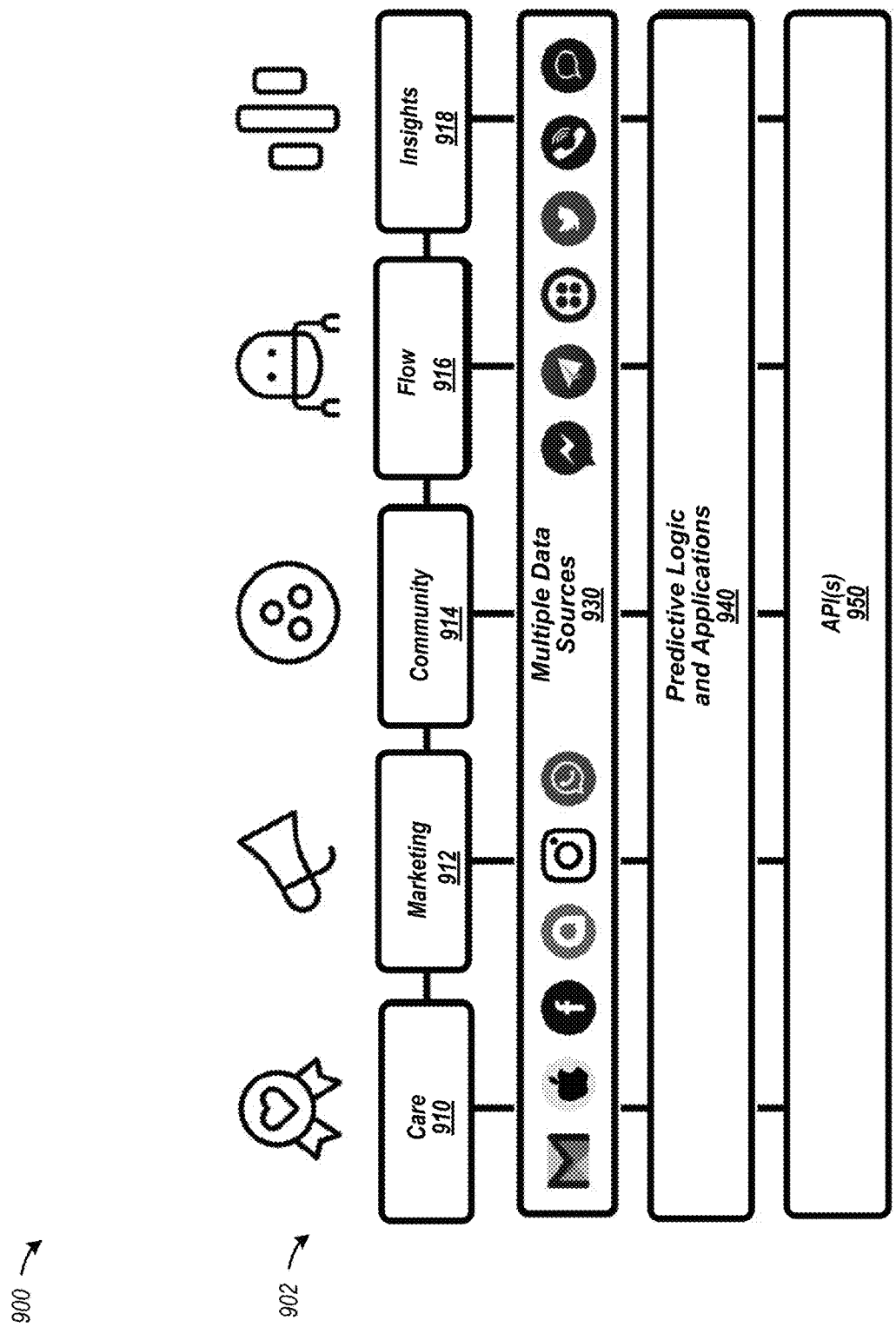
FIG. 9 depicts integration of multiple data applications configured to extract data from multiple data sources, according to some examples.

FIG. 9 depicts integration of multiple data applications configured to extract data from multiple data sources, according to some examples. As shown, platform 902 may include a customer care application 910, a marketing application 912, a community application 914, a flow-related application 916 (e.g., to automate messaging of specialized chatbots and voice-implemented applications via any type of API, such as a REST API), and an insights application 918. Applications 910 to 918 may generate any amount of data via an omnichannel configured to access multiple data sources 930 via APIs 950 and in response to computational processing of predictive logic and applications 940. An example of platform 902 is developed and maintained by Khoros, LLC, of Austin, Tex., USA.

Figure 10:
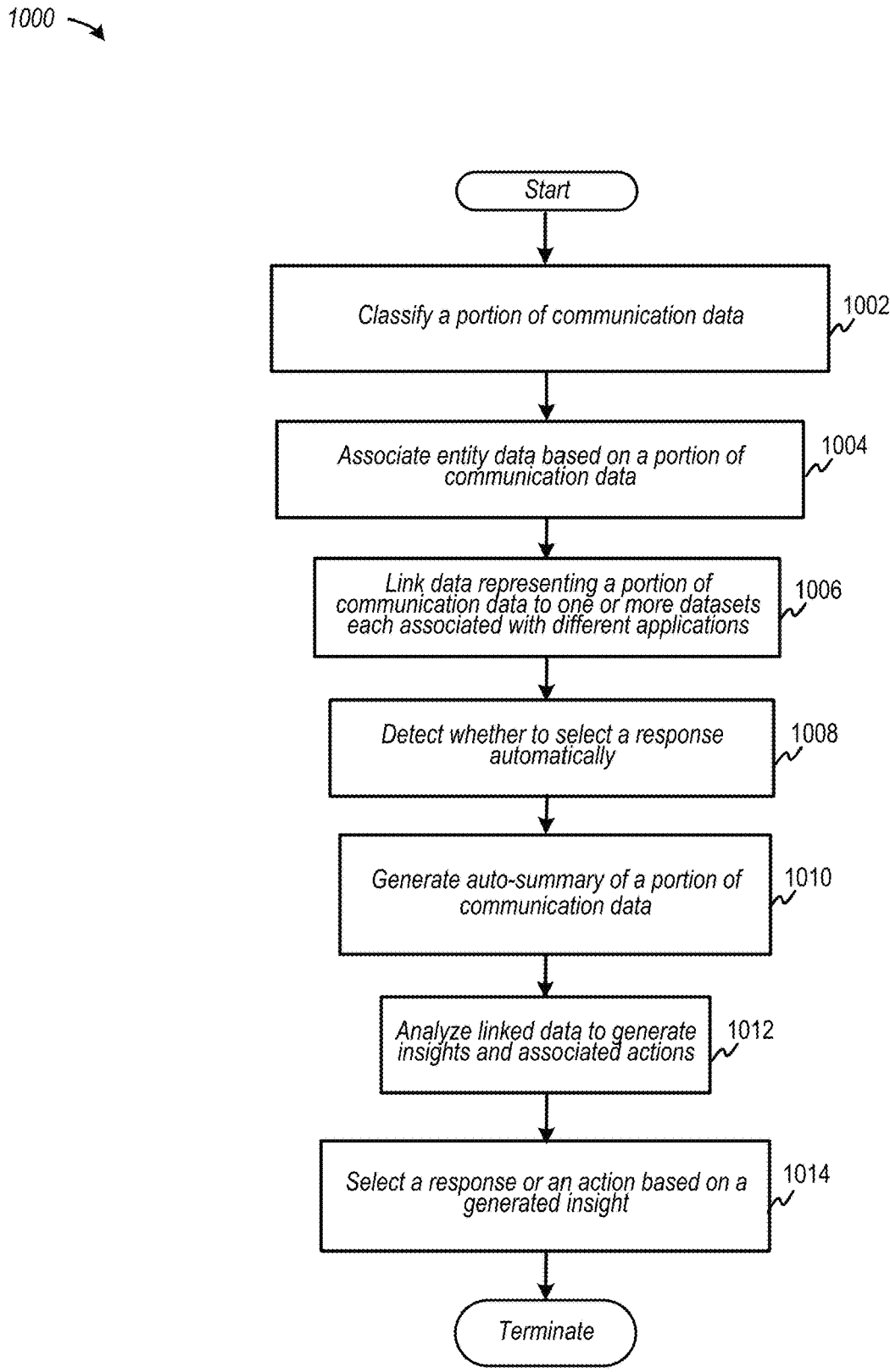
FIG. 10 depicts an example of flow configured to implement a universal data management engine, according to some examples.

FIG. 10 depicts an example of flow configured to implement a universal data management engine, according to some examples. Flow 1000 may begin at 1002, at which a portion of communication data may be classified and identified as a function of received voice data or text data, or both, whereby the classification be indicative of an intent, a topic, an entity attribute, a sentiment, or any other data associated with one or more portions of communication data. At 1004, entity or entity attribute data may be associated with a portion of communication data. At 1006, data representing a portion of communication data may be linked to one or more datasets. Each dataset may be associated with a different application configured to generate the dataset. In some examples, different applications may generate different datasets in context of an enterprise or any other organization. At 1008, a determination is made as to whether to select a response automatically, such as by implementing predictive logic or specialized automated bots. Otherwise, and optimize response may be provided to an agent to assist a customer-user via any number of channels. At 1010, an auto-summary (e.g., summary of one or more conversations or exchanges of communication data portions) may be generated to include at least a portion of communication data. Again, a portion of communication data may include or may be referenced as an utterance. At 1012, link data in a universal dataspace may be analyzed to derive insights and to predict optimize responses and actions that may be implemented automatically or with assistance of an agent. At 1014, a response or an action may be selected (e.g., automatically) based on generated insight, which may be determined as a function of linked data across multiple datasets.

Figure 11:
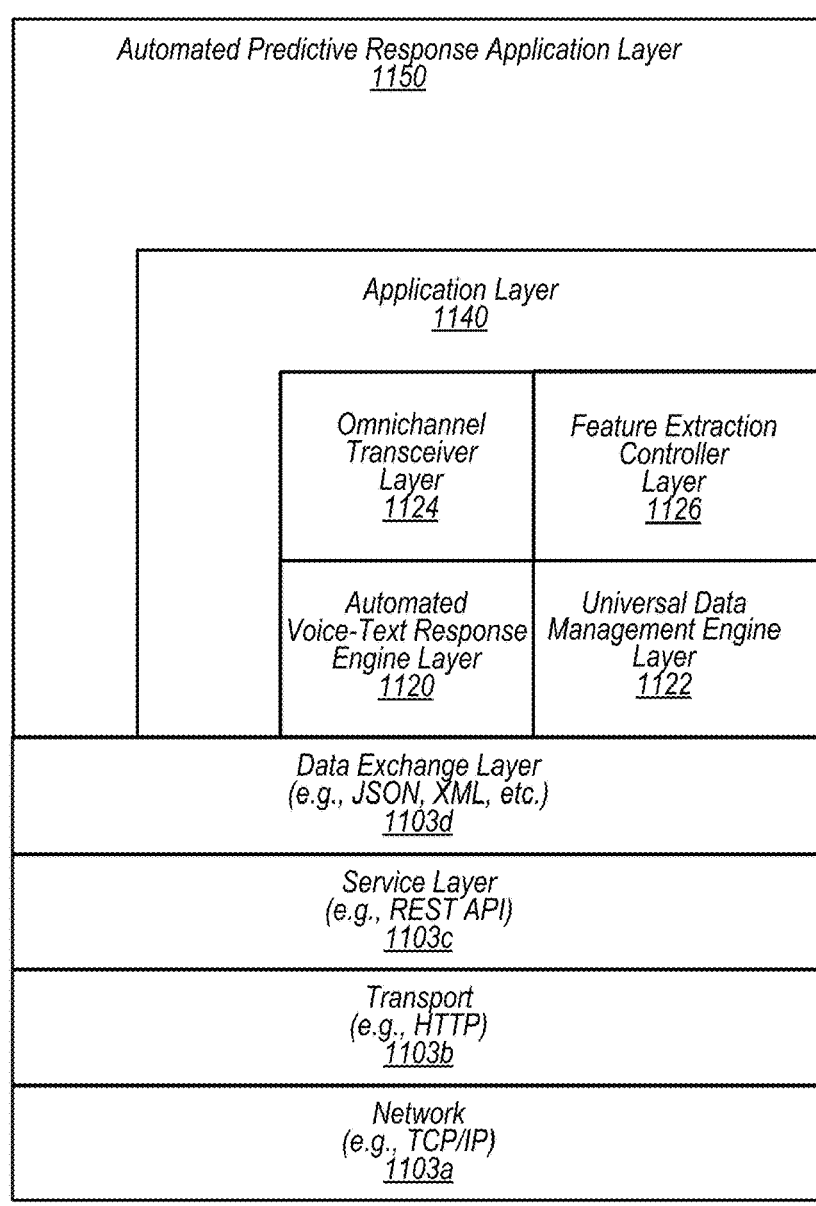
FIG. 11 illustrates an exemplary layered architecture for implementing an automated predictive response application, according to some examples.

FIG. 11 illustrates an exemplary layered architecture for implementing an automated predictive response application, according to some examples. Diagram 1100 depicts application stack ("stack") 1101, which is neither a comprehensive nor a fully inclusive layered architecture for detecting intent and entity attributes in electronic messages, and in response, automatically generating one or more compatible electronic messages as one or more responses or actions. One or more elements depicted in diagram 1100 of FIG. 11 may include structures and/or functions as similarly-named or similarly-numbered elements depicted in other drawings, or as otherwise described herein, in accordance with one or more examples, such as described relative to FIGS. 1-10 or any other figure or description provided herein.

Application stack 1101 may include an automated predictive response application layer 1150 upon application layer 1140, which, in turn, may be disposed upon any number of lower layers (e.g., layers 1103a to 1103d). Automated predictive response application layer 1150 may be configured to provide functionality and/or structure to implement an automated predictive response application and/or system, as described herein. Further, automated predictive response application 1150 and application layer 1140 may be disposed on data exchange layer 1103d, which may implemented using any programming language, such as HTML, JSON, XML, etc., or any other format to effect generation and communication of requests and responses among computing devices and computational resources constituting an enterprise or an entity and a planning application and/or platform configured to disseminate information expeditiously, such as information regarding products or services aligned with data in targeted data sources compatible with data integration. Data exchange layer 1103d may be disposed on a service layer 1103c, which may provide a transfer protocol or architecture for exchanging data among networked applications. For example, service layer 1103c may provide for a RESTful-compliant architecture and attendant web services to facilitate GET, PUT, POST, DELETE, and other methods or operations. In other examples, service layer 1103c may provide, as an example, SOAP web services based on remote procedure calls ("RPCs"), or any other like services or protocols (e.g., APIs). Service layer 1103c may be disposed on a transport layer 1103b, which may include protocols to provide host-to-host communications for applications via an HTTP or HTTPS protocol, in at least this example. Transport layer 303b may be disposed on a network layer 1103a, which, in at least this example, may include TCP/IP protocols and the like.

As shown, automated predictive response application layer 1150 may include (or may be layered upon) an application layer 1140 that includes logic constituting an omnichannel transceiver layer 1124, an automated voice-text response engine layer 1120, a feature extraction controller layer 1126, and a universal data management engine layer 1122. In various examples, layers 1120, 1122, 1124, and 1126 may include logic to implement the various functionalities described herein.

Any of the described layers of FIG. 11 or any other processes described herein in relation to other figures may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including, but not limited to, Python™, ASP, ASP.net, .Net framework, Ruby, Ruby on Rails, C, Objective C, C++, C#, Adobe® Integrated Runtime™ (Adobe® AIR™) ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc., as well as any proprietary application and software provided or developed by Khoros, LLC, Flow.ai B. V., or the like. The above-described techniques may be varied and are not limited to the embodiments, examples or descriptions provided.

Figure 12:
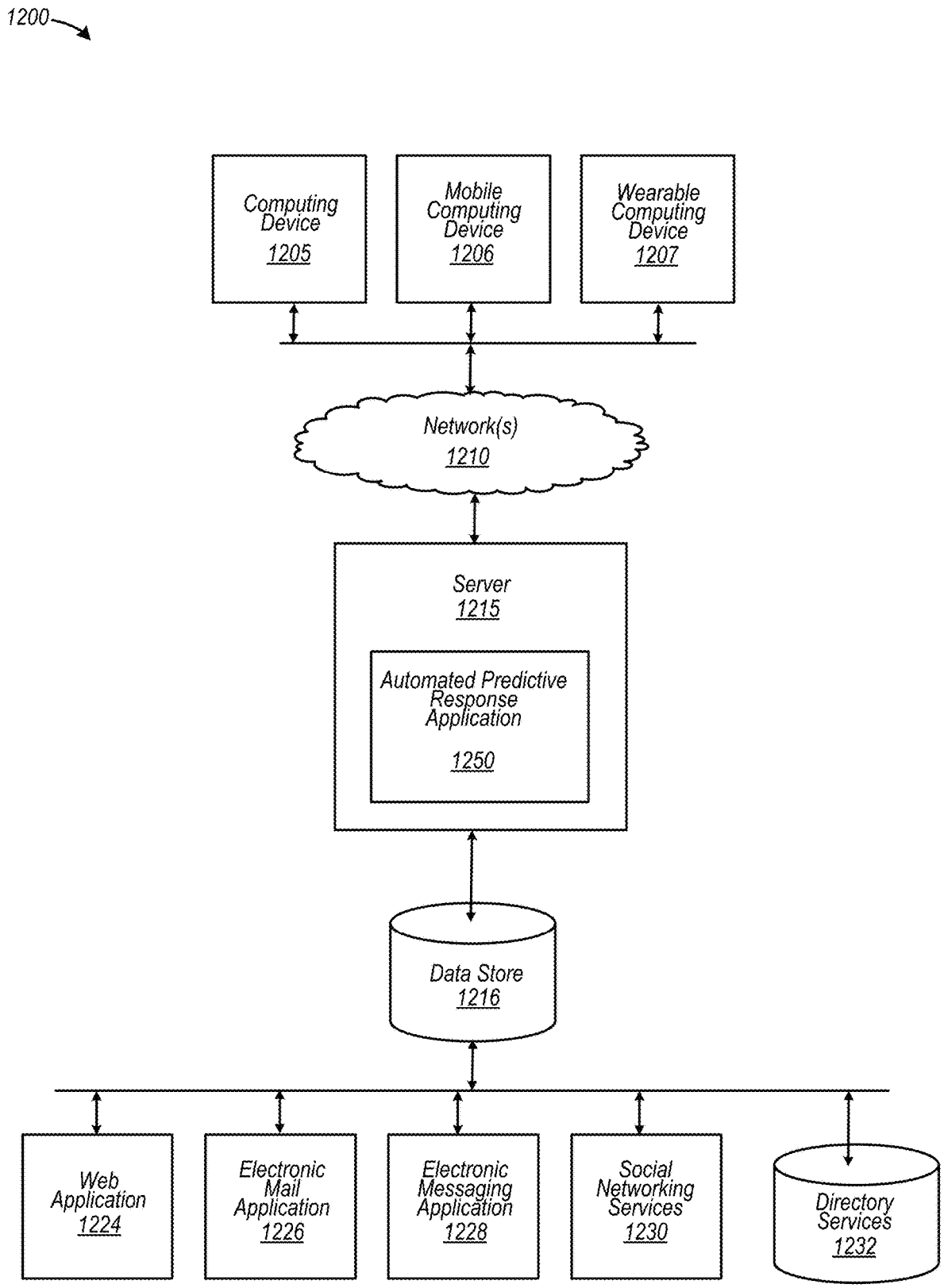
FIG. 12 depicts an example of a system architecture to provide a computing platform to host an application to analyze electronic messages including data associated with electronic messages, according to an example.

FIG. 12 depicts an example of a system architecture to provide a computing platform to host an application to analyze electronic messages including data associated with electronic messages, according to various examples. Data constituting executable instructions (e.g., remote applications) and other content, such as text, video, audio, etc. may be stored in (or exchanged with) various communication channels or storage devices. For example, various units of message data or content may be stored using one or more of a web application 1224 (e.g., a public data source, such as a new aggregation web site), an email application service 1226, an electronic messaging application 1228 (e.g., a texting or messenger application), social networking services 1230 and a services platform and repository 1232 (e.g., cloud computing services provided by Google® cloud platform, an AWS® directory service provided by Amazon Web Services, Inc., or any other platform service). A server 1215 may implement an automated predictive response application 1250 to perform various functionalities as described herein. As an example, server 1215 may be a web server providing the applications 1250 and 1252 via networks 1210. As an example, a client computing device may be implemented and/or embodied in a computer device 1205, a mobile computing device 1206 (e.g., a smart phone), a wearable computing device 1207, or any other computing device. Any of these client computing devices 1205 to 1207 may be configured to transmit electronic messages and content (e.g., as electronic text or documents, video content, audio content, or the like) from the store 1216, and may be configured to receive content (e.g., other electronic content).

Figure 13:
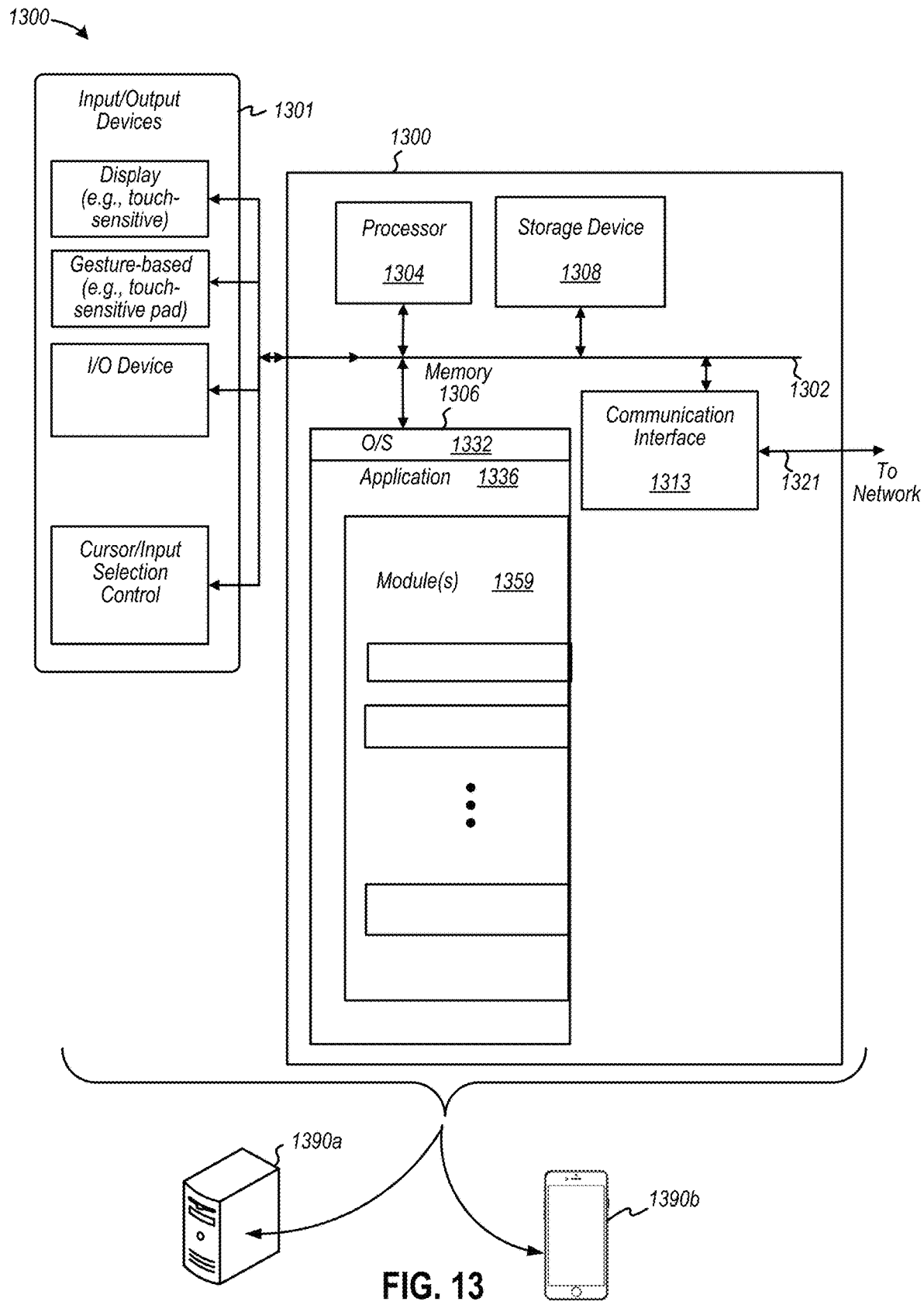
FIG. 13 illustrates examples of various computing platforms configured to provide various functionalities to components of an electronic message platform configured to analyze electronic message data and provide functionalities described herein.

FIG. 13 illustrates examples of various computing platforms configured to provide various functionalities to components of an electronic message platform 1300 configured to analyze electronic message data and provide functionalities described herein. Computing platform 1300 may be used to implement computer programs, applications, methods, processes, algorithms, or other software, as well as any hardware implementation thereof, to perform the above-described techniques.

In some cases, computing platform 1300 or any portion (e.g., any structural or functional portion) can be disposed in any device, such as a computing device 1390a, mobile computing device 1390b, and/or a processing circuit in association with initiating any of the functionalities described herein, via user interfaces and user interface elements, according to various examples.

Computing platform 1300 includes a bus 1302 or other communication mechanism for communicating information, which interconnects subsystems and devices, such as processor 1304, system memory 1306 (e.g., RAM, etc.), storage device 1308 (e.g., ROM, etc.), an in-memory cache (which may be implemented in RAM 1306 or other portions of computing platform 1300), a communication interface 1313 (e.g., an Ethernet or wireless controller, a Bluetooth controller, NFC logic, etc.) to facilitate communications via a port on communication link 1321 to communicate, for example, with a computing device, including mobile computing and/or communication devices with processors, including database devices (e.g., storage devices configured to store atomized datasets, including, but not limited to triplestores, etc.). Processor 1304 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1300 exchanges data representing inputs and outputs via input-and-output devices 1301, including, but not limited to, keyboards, mice, audio inputs (e.g., speech-to-text driven devices), user interfaces, displays, monitors, cursors, touch-sensitive displays, touch-sensitive input and outputs (e.g., touch pads), LCD or LED displays, and other I/O-related devices.

Note that in some examples, input-and-output devices 1301 may be implemented as, or otherwise substituted with, a user interface in a computing device associated with, for example, a user account identifier in accordance with the various examples described herein.

According to some examples, computing platform 1300 performs specific operations by processor 1304 executing one or more sequences of one or more instructions stored in system memory 1306, and computing platform 1300 can be implemented in a client-server arrangement, peer-to-peer arrangement, or as any mobile computing device, including smart phones and the like. Such instructions or data may be read into system memory 1306 from another computer readable medium, such as storage device 1308. In some examples, hard-wired circuitry may be used in place of or in combination with software instructions for implementation. Instructions may be embedded in software or firmware. The term "computer readable medium" refers to any tangible medium that participates in providing instructions to processor 1304 for execution. Such a medium may take many forms, including but not limited to, non-volatile media and volatile media. Non-volatile media includes, for example, optical or magnetic disks and the like. Volatile media includes dynamic memory, such as system memory 1306.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1302 for transmitting a computer data signal.

In some examples, execution of the sequences of instructions may be performed by computing platform 1300. According to some examples, computing platform 1300 can be coupled by communication link 1321 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1300 may transmit and receive messages, data, and instructions, including program code (e.g., application code) through communication link 1321 and communication interface 1313. Received program code may be executed by processor 1304 as it is received, and/or stored in memory 1306 or other non-volatile storage for later execution.

In the example shown, system memory 1306 can include various modules that include executable instructions to implement functionalities described herein. System memory 1306 may include an operating system ("O/S") 1332, as well as an application 1336 and/or logic module(s) 1359. In the example shown in FIG. 13, system memory 1306 may include any number of modules 1359, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. These can be varied and are not limited to the examples or descriptions provided.

In some embodiments, modules 1359 of FIG. 13, or one or more of their components, or any process or device described herein, can be in communication (e.g., wired or wirelessly) with a mobile device, such as a mobile phone or computing device, or can be disposed therein.

In some cases, a mobile device, or any networked computing device (not shown) in communication with one or more modules 1359 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

For example, modules 1359 or one or more of its/their components, or any process or device described herein, can be implemented in one or more computing devices (i.e., any mobile computing device, such as a wearable device, such as a hat or headband, or mobile phone, whether worn or carried) that include one or more processors configured to execute one or more algorithms in memory. Thus, at least some of the elements in the above-described figures can represent one or more algorithms. Or, at least one of the elements can represent a portion of logic including a portion of hardware configured to provide constituent structures and/or functionalities. These can be varied and are not limited to the examples or descriptions provided.

As hardware and/or firmware, the above-described structures and techniques can be implemented using various types of programming or integrated circuit design languages, including hardware description languages, such as any register transfer language ("RTL") configured to design field-programmable gate arrays ("FPGAs"), application-specific integrated circuits ("ASICs"), multi-chip modules, or any other type of integrated circuit. For example, modules 1359 or one or more of its/their components, or any process or device described herein, can be implemented in one or more computing devices that include one or more circuits. Thus, at least one of the elements in the above-described figures can represent one or more components of hardware. Or, at least one of the elements can represent a portion of logic including a portion of a circuit configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
receiving via an omnichannel transceiver data representing an electronic message associated with an electronic communication channel in a plurality of various electronic communication channels associated with multiple data sources, each of which is associated with a processor and memory;
detecting that the electronic message includes at least one of inbound voice data or other inbound data;
analyzing the inbound voice data to characterize a portion of communication data associated with the electronic message to form a characterized portion of communication data;
invoking an automated response application to generate a response automatically including outbound voice data responsive to the inbound voice data;
selecting the response including the outbound voice data as a predicted response based on data representing the characterized portion of communication data;
transmitting the response as the outbound voice data; and
generating a data record of exchanged data in the electronic message and other electronic messages.

2. The method of claim 1 wherein invoking the automated response application comprises:
activating an automated voice-text response application.

3. The method of claim 2 further comprising:
implementing an interactive voice response ("IVR") application configured to provide voice responses and text responses.

4. The method of claim 1 wherein detecting that the electronic message comprises:
detecting the other inbound data includes text data or image data.

5. The method of claim 1 wherein analyzing the inbound voice data comprises:
extracting features from the portion of communication data; and
identifying data representing intent-related data and data representing one or more entity attributes.

6. The method of claim 5 further comprising:
identifying the predicted response based on the data representing intent-related data and the data representing one or more entity attributes.

7. The method of claim 1 further comprising:
detecting the other inbound data includes text data; and
transmitting the response as a text-based response.

8. The method of claim 1 further comprising:
accessing the inbound voice data from via a third-party electronic communication channel.

9. The method of claim 1 wherein generating the data record of exchanged data comprises:
generating a text-based transcript data file based on voice data and text data in one or more portions of communication data.

10. The method of claim 1 further comprises:
accessing executable data configured to implement a flow configured to capture an exchange of data representing a conversation in portions of voice data or text data, or a combination thereof.

11. A system comprising:
a data store configured to receive streams of data via a network into an application computing platform; and
a processor configured to execute instructions to implement an application configured to:
detect that the electronic message includes at least one of inbound voice data or other inbound data;
analyze the inbound voice data to characterize a portion of communication data associated with the electronic message to form a characterized portion of communication data;
invoke an automated response application to generate a response including outbound voice data responsive to the inbound voice data;
select the response including the outbound voice data as a predicted response based on data representing the characterized portion of communication data;
transmitting the response as the outbound voice data; and
generating a data record of exchanged data in the electronic message and other electronic messages.

12. The system of claim 11 wherein the processor is further configured to:
activate an automated voice-text response application.

13. The system of claim 11 wherein the processor is further configured to:
implement an interactive voice response ("IVR") application configured to provide voice responses and text responses.

14. The system of claim 11 wherein the processor configured to detect that the electronic message is further configured to:
detect the other inbound data includes text data or image data.

15. The system of claim 11 wherein the processor configured to analyze the inbound voice data is further configured to:
extract features from the portion of communication data; and
identify data representing intent-related data and data representing one or more entity attributes.

16. The system of claim 15 wherein the processor is further configured to:
identify the predicted response based on the data representing intent-related data and the data representing one or more entity attributes.

17. The system of claim 11 wherein the processor is further configured to:
detect the other inbound data includes text data; and
transmit the response as a text-based response.

18. The system of claim 11 wherein the processor is further configured to:
access the inbound voice data from via a third-party electronic communication channel.

19. The system of claim 11 wherein the processor is further configured to:
generate a text-based transcript data file based on voice data and text data in one or more portions of communication data.

20. The system of claim 11 wherein the processor is further configured to:
access executable data configured to implement a flow configured to capture an exchange of data representing a conversation in portions of voice data or text data, or a combination thereof.

* * * * *